United States Patent
Yunusov et al.

(10) Patent No.: US 11,956,799 B2
(45) Date of Patent: Apr. 9, 2024

(54) EARLY TERMINATION OF BLIND DECODING WITH RATELESS CODING

(71) Applicant: QUALCOMM Incorporated, San Diego, CA (US)

(72) Inventors: David Yunusov, Holon (IL); Gideon Shlomo Kutz, Ramat Hasharon (IL); Assaf Touboul, Netanya (IL); Tal Oved, Modiin (IL)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 17/529,196

(22) Filed: Nov. 17, 2021

(65) Prior Publication Data

US 2023/0156717 A1    May 18, 2023

(51) Int. Cl.
*H04W 72/23* (2023.01)
*H04W 48/08* (2009.01)

(52) U.S. Cl.
CPC ......... *H04W 72/23* (2023.01); *H04W 48/08* (2013.01)

(58) Field of Classification Search
None
See application file for complete search history.

(56) References Cited

U.S. PATENT DOCUMENTS

| 11,284,429 | B2* | 3/2022 | Abdoli ................ H04L 5/0055 |
| 2019/0014548 | A1* | 1/2019 | Pelletier ............ H04W 56/001 |
| 2020/0008231 | A1* | 1/2020 | Vilaipornsawai ..... H04W 72/21 |

OTHER PUBLICATIONS

'Spinal Codes', Jonathan Perry, Peter A. Iannucci, Kermin E. Fleming, Hari Balakrishnan, and Devavrat Shah, Massachusetts Institute of Technology, Cambridge, Mass., USA, ACM SIGCOMM Computer Communication Review 42.4 (2012): 49-60.

* cited by examiner

*Primary Examiner* — Hong S Cho
(74) *Attorney, Agent, or Firm* — Arun Swain

(57) ABSTRACT

This disclosure provides systems, methods and apparatus, including computer programs encoded on computer storage media, for early termination of decoding attempts, including decoding attempts associated with physical downlink control channel (PDCCH) candidates that are encoded using a rateless code. In some aspects, a transmitting device may encode a message using a rateless code associated with a cumulative encoding of various portions of the message, and using a device identifier or group identifier as an input to the encoding. Similarly, a receiving device may receive an encoded signal over candidate resources and may attempt to decode the signal in accordance with the rateless code and using a device identifier or a group identifier as an input to the decoding. As such, intended or non-intended receiving device may be able to evaluate whether to proceed with a decoding attempt or to terminate a decoding attempt at a relatively early stage.

30 Claims, 11 Drawing Sheets

EARLY TERMINATION OF BLIND DECODING WITH RATELESS CODING

TECHNICAL FIELD

This disclosure relates to wireless communications, including early termination of blind decoding with rateless coding.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving, at the UE, an indication of an identifier associated with the UE, receiving, at the UE, an indication of a search space associated with a set of one or more physical channel candidates encoded with a rateless coding, and monitoring the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding.

Another innovative aspect of the subject matter described in this disclosure can be implemented in an apparatus for wireless communications at a UE. The apparatus may include a first interface, a second interface, and a processing system. The first interface may be configured to obtain, at the UE, an indication of an identifier associated with the UE and obtain, at the UE, an indication of a search space associated with a set of one or more physical channel candidates encoded with a rateless coding. The first interface, the second interface, or the processing system may be configured to monitor the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, at the UE, an indication of an identifier associated with the UE, receive, at the UE, an indication of a search space associated with a set of one or more physical channel candidates encoded with a rateless coding, and monitor the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding.

Another innovative aspect of the subject matter described in this disclosure can be implemented in another apparatus for wireless communications at a UE. The apparatus may include means for receiving, at the UE, an indication of an identifier associated with the UE, means for receiving, at the UE, an indication of a search space associated with a set of one or more physical channel candidates encoded with a rateless coding, and means for monitoring the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding.

Another innovative aspect of the subject matter described in this disclosure can be implemented in a non-transitory computer-readable medium storing code for wireless communications at a UE. The code may include instructions executable by a processor to receive, at the UE, an indication of an identifier associated with the UE, receive, at the UE, an indication of a search space associated with a set of one or more physical channel candidates encoded with a rateless coding, and monitor the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding.

In some implementations of the method, apparatuses, and non-transitory computer-readable medium described herein, attempting to decode the physical channel candidate may include operations, features, means, or instructions for receiving, as an output of a set of one or more hash functions of the rateless coding, a set of candidate encoded values in accordance with inputting, into the set of one or more hash functions, the identifier associated with the UE and a set of candidate bit values for the physical channel candidate, receiving, as an output of a numeric transposition function of the rateless coding, a set of candidate symbol values in accordance with inputting, into the numeric transposition function, each of the set of candidate encoded values, and comparing a measurement of a signal associated with the physical channel candidate with each candidate symbol value of the set of candidate symbol values.

In some implementations of the method, apparatuses, and non-transitory computer-readable medium described herein, comparing the measurement of the signal associated with the physical channel candidate with each candidate symbol value of the set of candidate symbol values may include operations, features, means, or instructions for determining, for each candidate symbol value of the set of candidate symbol values, a respective Euclidian distance between the measurement of the signal associated with the physical channel candidate and the candidate symbol value.

Some implementations of the method, apparatuses, and non-transitory computer-readable medium described herein may further include operations, features, means, or instructions for terminating the attempting to decode the physical channel candidate as a result of each of the comparisons, of the measurement of the signal associated with the physical channel candidate with each candidate symbol value of the set of candidate symbol values, failing to satisfy a decoding metric threshold.

One innovative aspect of the subject matter described in this disclosure can be implemented in a method for wireless communications at a network entity. The method may include transmitting, to a UE, an indication of an identifier associated with the UE, transmitting, to the UE, an indication of a search space associated with a set of one or more physical channels encoded with a rateless coding, and transmitting, to the UE, a physical channel transmission using resources of the search space, where the physical channel transmission is encoded in accordance with the rateless coding using the identifier associated with the UE as an input value of the encoding.

Another innovative aspect of the subject matter described in this disclosure can be implemented in an apparatus for wireless communications at a network entity. The apparatus may include an interface and a processing system. The interface may be configured to output, to a UE, an indication of an identifier associated with the UE, output, to the UE, an indication of a search space associated with a set of one or more physical channels encoded with a rateless coding, and output, to the UE, a physical channel transmission using resources of the search space, where the physical channel transmission is encoded in accordance with the rateless coding using the identifier associated with the UE as an input value of the encoding.

Another innovative aspect of the subject matter described in this disclosure can be implemented in another apparatus for wireless communications at a network entity. The apparatus may include a processor, memory coupled with the processor, and instructions stored in the memory. The instructions may be executable by the processor to cause the apparatus to transmit, to a UE, an indication of an identifier associated with the UE, transmit, to the UE, an indication of a search space associated with a set of one or more physical channels encoded with a rateless coding, and transmit, to the UE, a physical channel transmission using resources of the search space, where the physical channel transmission is encoded in accordance with the rateless coding using the identifier associated with the UE as an input value of the encoding.

Another innovative aspect of the subject matter described in this disclosure can be implemented in another apparatus for wireless communications at a network entity. The apparatus may include means for transmitting, to a UE, an indication of an identifier associated with the UE, means for transmitting, to the UE, an indication of a search space associated with a set of one or more physical channels encoded with a rateless coding, and means for transmitting, to the UE, a physical channel transmission using resources of the search space, where the physical channel transmission is encoded in accordance with the rateless coding using the identifier associated with the UE as an input value of the encoding.

Another innovative aspect of the subject matter described in this disclosure can be implemented in a non-transitory computer-readable medium storing code for wireless communications at a network entity. The code may include instructions executable by a processor to transmit, to a UE, an indication of an identifier associated with the UE, transmit, to the UE, an indication of a search space associated with a set of one or more physical channels encoded with a rateless coding, and transmit, to the UE, a physical channel transmission using resources of the search space, where the physical channel transmission is encoded in accordance with the rateless coding using the identifier associated with the UE as an input value of the encoding.

Some implementations of the method, apparatuses, and non-transitory computer-readable medium described herein may further include operations, features, means, or instructions for encoding the physical channel transmission, where the encoding includes, receiving, as an output of a set of one or more hash functions, an encoded value in accordance with inputting, into the set of one or more hash functions, the identifier associated with the UE and a set of bit values associated with the physical channel transmission, receiving, as an output of a numeric transposition function, a symbol value in accordance with inputting, into the numeric transposition function, the encoded value, and mapping the symbol value to the resources of the search space for transmission.

Some implementations of the method, apparatuses, and non-transitory computer-readable medium described herein may further include operations, features, means, or instructions for transmitting, to a second UE, a second physical channel transmission using second resources of the search space, where the second physical channel transmission may be encoded in accordance with the rateless coding using a second identifier associated with the second UE, different than the identifier associated with the UE, as an input.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
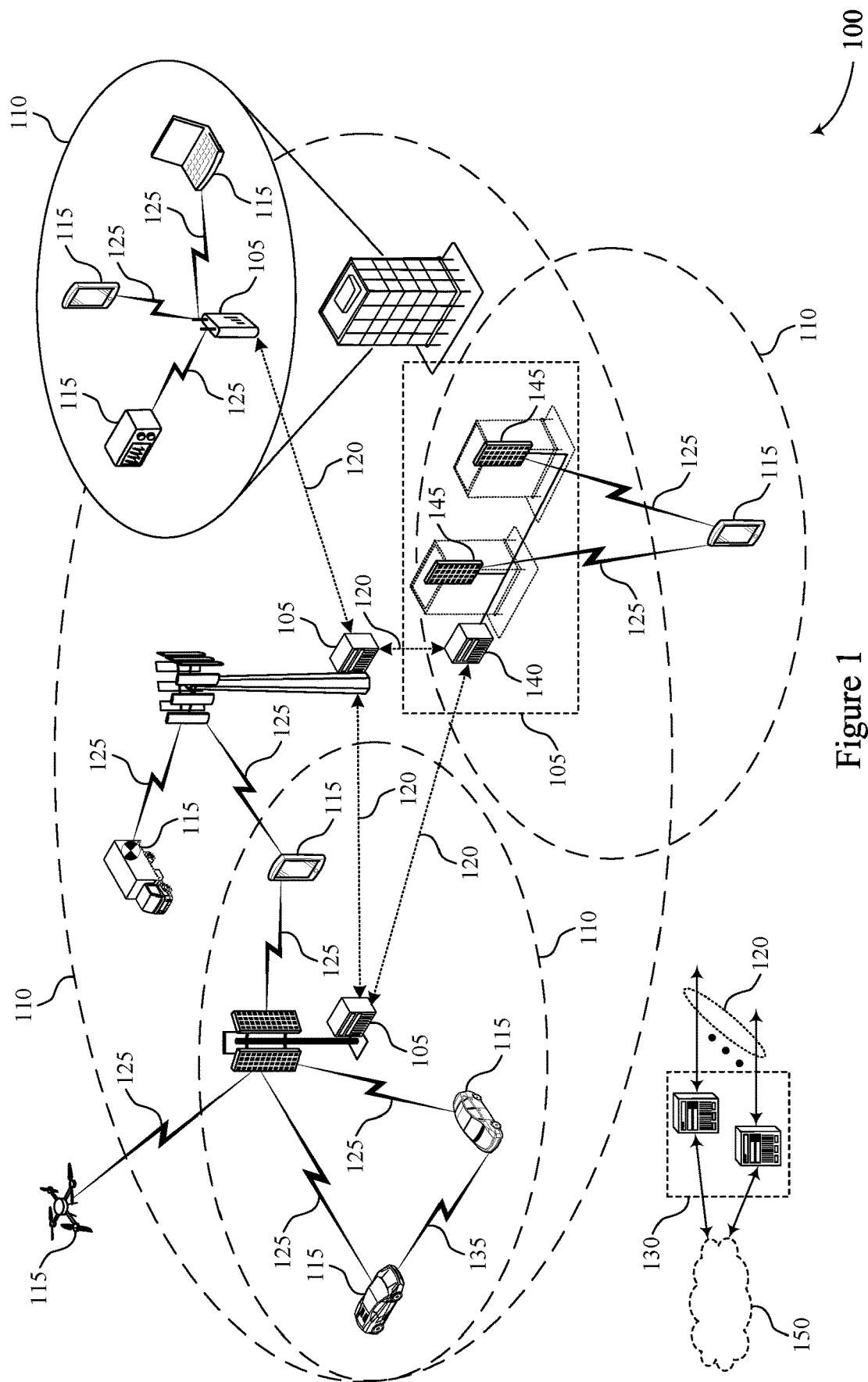
FIG. 1 shows an example wireless communications system that supports early termination of blind decoding with rateless coding.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

In some wireless communications systems, communicating devices may use a rateless coding scheme, such as a spinal coding scheme, for rate adaptation that avoids relying on channel state information (CSI) reference signal (CSI-RS) measurements and reports, among other channel estimation techniques. Such rate adaptation using a rateless coding scheme may enable communicating devices to more-efficiently approach a channel capacity in terms of bit rate or channel rate, including for frequency selective or time selective channels. Some rateless coding schemes, including a spinal coding scheme, may include multiple coding stages across which different cumulative portions of a message are encoded or decoded. For example, each coding stage may be associated with an input of a set of bits of a message segment and an encoded value from a previous coding stage conveying information pertaining to prior message segments. Some aspects relating to coding or decoding across one or more of the multiple coding stages may be associated with an initial state, a seed value, or some other parameter. For example, for some rateless coding schemes, including a spinal coding scheme, a first or initial coding stage may be associated with an input of a set of bits of a first or initial message segment and an initial state, which, in some systems, may be set or configured to a static value.

In some implementations of the present disclosure, communicating devices may set or configure an initial state, a seed value, or some other parameter associated with one or more coding stages with a device identifier, such as an identifier of a receiving device or an identifier of a transmitting device, which may support an early termination of a decoding attempt for one or more signals encoded using a rateless coding scheme. For example, a transmitting device may configure an initial state or seed value of an encoding scheme to correspond to an identifier associated with one or more target receiving devices. In an example of such an implementation pertaining to downlink transmissions, one or more components of a base station (BS) may encode control information, such as downlink control information (DCI), using a rateless coding scheme and may transmit a signal (such as a modulation symbol) associated with the encoded control information to a user equipment (UE) over one or more physical downlink control channel (PDCCH) candidates (such as candidates of a search space or communications resources of a search space) configured for the UE and, in some implementations, may set or configure an initial state of the rateless coding scheme to an identifier associated with the UE. The UE may monitor the PDCCH candidates, which may include evaluating whether a PDCCH candidate includes a signal intended for the UE, by attempting to decode signals in accordance with the rateless coding scheme and an identifier associated with the UE. For example, such an evaluation may include a hypothesis testing procedure or a candidate testing procedure that is based on assuming or inputting the identifier associated with the UE as an initial value of the rateless coding scheme, and determining whether a measurement of a PDCCH candidate is within a threshold separation (such as within a threshold Euclidian distance) of possible symbol values of the rateless coding scheme that would result from the identifier associated with the UE being implemented as the initial value. Such an evaluation may be associated with a partial or incomplete decoding of the PDCCH candidate, such as attempting to decode a subset of possible candidate symbol values to support the determination of whether or not the PDCCH candidate includes signaling for the UE.

For example, to evaluate whether signals received over PDCCH candidate resources are intended for the UE, the UE may attempt a decoding procedure (such as performing a partial decoding procedure or an incomplete decoding procedure) associated with the rateless coding scheme for the received signals using the identifier as the initial state and may calculate a decoding metric (such as a path cost) across one or more coding stages. A path cost may be an example of or refer to a metric in a decoder that provides a value for a quality (such as a level or measurement of "correctness") of the decoder or of the decoding procedure. For some rateless coding schemes, such as spinal codes, a smaller value of a path cost may be associated with a higher quality of the decoder or of the decoding procedure, and a UE may calculate the path cost as an accumulated value over the spinal decoding stages (such as an accumulation or summation over successive coding indices of a rateless coding). In some implementations, the UE may calculate the decoding metric across a threshold quantity of coding stages and may compare the decoding metric to a threshold decoding metric. If the decoding metric satisfies a threshold decoding metric, the UE may assume that a received signal is intended for the UE and may proceed with attempting to decode the received signal across any remaining decoding operations (such as to receive or otherwise process or interpret the encoded control information). Alternatively, if the decoding metric fails to satisfy the threshold decoding metric (which may result from signaling of the PDCCH candidate being encoded with an identifier associated with a different UE being used as an initial value for the encoding), the UE may assume that the received signal is not intended for the UE and may terminate the decoding of the received signals (such as terminating a decoding attempt before interpreting contents of the received signals in a digital domain or data domain).

Particular implementations of the subject matter described in this disclosure can be implemented to realize one or more of the following potential advantages. For example, as a result of supporting a configuration of an initial state, a seed value, or some other parameter associated with one or more coding stages of a coding scheme in accordance with an identifier associated with an intended receiving UE, a UE may be able to terminate decoding of PDCCH candidates early (such as prior to completely decoding a received signal or prior to determining information that has been encoded) if the UE detects that a decoding metric (such as a path cost) fails to satisfy a threshold decoding metric at a relatively early coding stage. As such, a UE may avoid completely decoding a signal that is not intended for that UE, which may, for example, include terminating a decoding attempt for a received signal without performing a comparison (such as a comparison at the receiving device) of a device identifier of a receiving device with a device identifier that would have otherwise been decoded from the received signal. Such techniques may reduce latency, reduce processing load, or reduce power consumption of a decoder (such as a spinal decoder), including such reductions when evaluating a search space for possible transmissions intended for a receiving device. Additionally, such techniques may support more efficient spectrum utilization by supporting a broader or more complex search space, or may improve processing utilization, among other benefits.

FIG. 1 shows an example wireless communications system 100 that supports early termination of blind decoding with rateless coding. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (such as mission expected) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (such as via an S1, N2, N3, or another interface). The BSs 105 may communicate with one another over the backhaul links 120 (such as via an X2, Xn, or another interface) either directly (such as directly between BSs 105), or indirectly (such as via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (such as a duration of one modulation symbol) and one subcarrier, where the symbol period and subcarrier spacing are inversely related. The quantity of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

Some UEs 115 may be configured to employ operating modes that reduce power consumption, such as half-duplex communications (such as a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1-M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105). In various implementations, a BS 105, or an access network entity 140, or a core network 130, or some subcomponent thereof, may be referred to as a network entity.

As described herein, a BS 105 may include one or more components that are located at a single physical location or one or more components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 (also known as a monolithic BS) or a BS 105 including components that are located at various physical locations or virtualized locations (also known as a disaggregated BS). In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (or centralized unit CU), a distributed unit (DU), or a radio unit (RU).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be associated with a CA configuration in conjunction with component carriers operating in a licensed band (such as LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at a medium access control (MAC) layer in poor radio conditions (such as low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some implementations, communicating devices may employ an incremental redundancy scheme, such as a multi-incremental redundancy scheme (MIRS), which also may be referred to as an MRS, to reduce a gap between a suitable or optimal link adaptation and link adaptation performance associated with some other schemes. In some aspects, MIRS may be associated with rateless codes to achieve better performance across coding rates (and IR-HARQ transmissions) relative to fixed rate codes such as low-density parity-check (LDPC) codes. Further, in addition to rate selection (such as a modulation and coding scheme (MCS) selection), a device may employ an MIRS to facilitate selection of a precoding matrix indicator (PMI) and a rank indicator (RI).

Further, a device, using an MIRS, may rely on usage of IR-HARQ for rate or link adaptation instead of attempting to predict a channel capacity (such as via a CSI-RS measurement). For example, a transmitting device employing an MIRS may perform a first transmission corresponding to or using a highest speculated, assumed, or possible MCS for a current channel (such that if multiple options exist, the device may select a highest MCS of the multiple options) and may add a relatively small amount of redundancy for each subsequent transmission (such as each subsequent retransmission) if the first transmission fails. The transmitting device may terminate or stop transmissions (such as retransmissions) once a message is successfully decoded at a receiving device (in accordance with continuous acknowledgment (ACK)/negative acknowledgment (NACK) being sent to the transmitting device from the receiving device). The transmitting device may optionally use the continuous ACK/NACK received from the receiving device to adjust a wideband precoding associated with the transmitted message. In accordance with or as a result of using an MIRS, communicating devices may communicate at a code rate which is at or near a capacity (such as an upper limit code rate supported by a channel) regardless of mobility level of the communicating devices.

A transmitting device may employ different types of MIRS, including a first type associated with an adaptive MCS in accordance with an MIRS principle with fixed precoding and a second type associated with an adaptive MCS in accordance with an MIRS principle with variable precoding (such as a variable precoding facilitated by continuous feedback). In some implementations, a transmitting device may achieve a higher data rate using an MIRS as compared to a baseline selection of a highest MCS that is fixed in a CSI interval. For example, the first type of MIRS associated with a fixed precoding scheme may result in similar MCS selection at some velocities (such as a velocity of approximately 10 kilometers per hour) and more suitable MCS selection for relatively higher velocities (such as velocities greater than approximately 10 kilometers per hour) because MIRS may provide ACK/NACK per codeblock. Further, the second type of MIRS associated with an adaptive precoding may result in a higher data rate (such as by an approximately 0.6-3.1 dB gain) as compared to a baseline selection of a highest transmission power for a precoding that is fixed in a CSI interval.

Some systems, such as the wireless communications system 100, may support rateless coding schemes. Such rateless coding schemes may be associated with a rate adaptation technique that does not rely on CSI-RS-based adaptations, and may allow communicating devices, such as one or more UEs 115 or one or more components of a BS 105, to achieve or approach channel capacity even in high mobility scenarios. For example, rateless coding schemes may provide a greater capability of bit loading to approach capacity in frequency selective or time selective channels. Even for additive white Gaussian noise (AWGN), for example, rateless coding schemes may achieve higher data rates as compared to fixed rate systems (due, in part, to a hedging effect).

In some aspects, the wireless communications system 100 may implement an MIRS to support rateless coding schemes. For example, to capitalize on potential use implementations for an MIRS, communicating devices may incorporate rateless codes with the MIRS adaptation scheme. The wireless communications system 100 may support one or more types of rateless codes, including spinal codes. In some aspects, communicating devices may use a pre-defined or pre-configured puncturing scheme to support rate adaptation for rateless codes and may support one or more signaling mechanisms for exchanging information associated with a puncturing scheme or updates to a puncturing scheme.

In some implementations of the wireless communications system 100, a receiving device may monitor communication resources (such as resources in a frequency domain, resources in a time domain, or resources in a spatial domain, or any combination thereof) for transmissions intended for the receiving device. For example, in the context of downlink transmissions, a UE 115 may monitor or search for one or more control signals, transmitted from one or more components of a BS 105, over a set of one or more search spaces (including over a set of one or more PDCCH candidates). For example, a UE 115 may receive, from one or more components of a BS 105, an indication or configuration of a search space set including or indicating one or more PDCCH candidates, each PDCCH candidate corresponding to a respective resource in the time domain and frequency domain. The UE 115 may monitor over or search each of the one or more PDCCH candidates as possible locations (such as possible locations in time and frequency, some of which may be non-empty, or include a control signal, and some others of which may be empty, or not include a control signal) for one or more control signals sent from one or more components of the BS 105.

In some implementations, a UE 115 and one or more components of a BS 105 may support a detection pruning criteria that may support the UE 115 pruning or terminating a decoding process for a PDCCH candidate after one or more (such as relatively few) stages of a decoding procedure associated with a rateless coding scheme. For example, a UE 115 or one or more components of a BS 105 may set or configure a UE identifier, such as a radio network temporary identifier (RNTI), as an initial state or seed value associated with a rateless coding scheme (such as a spinal coding scheme). As such, one or more components of a BS 105 may encode a PDCCH message using an initial state or seed value set to an RNTI of an intended receiving UE 115, and another UE 115 (such as a UE 115 that is not associated with the same RNTI as the intended receiving UE 115) may abort or terminate a decoding attempt for the PDCCH message by calculating a decoding metric (such as a path cost) for the decoding attempt that is rooted in an RNTI of that other UE 115 (which may cause the decoding metric or path cost to become large at relatively early coding stages).

Although some examples for using a device identifier as an input to a coding scheme are provided in the context of downlink communications, such as for coding PDCCH transmissions to support partial or incomplete decoding of candidates of a PDCCH search space, such techniques may be extended to other examples of communications in accordance with the present disclosure. For example, the described techniques may be applied to uplink communications, such as when a transmitting UE 115 encodes information using an identifier of a target receiving BS 105 as an initial state or seed value of the encoding, or may be applied to sidelink communications, such as when a transmitting UE 115 encodes information using an identifier of a target receiving UE 115 as an initial state or seed value of the encoding. Moreover, the described techniques may be applied to broadcast communications, multicast communications, or other communications with a group of receiving devices, such as when a transmitting device encodes information using a group radio network temporary identity (G-RNTI), or a multicast cell radio network temporary identity (MC-RNTI), or some other group-specific identifier as an initial state or seed value of the encoding, which, in accordance with the described techniques, may be used by a group of receiving devices to evaluate signals for decoding before such decoding is completed.

Figure 2:
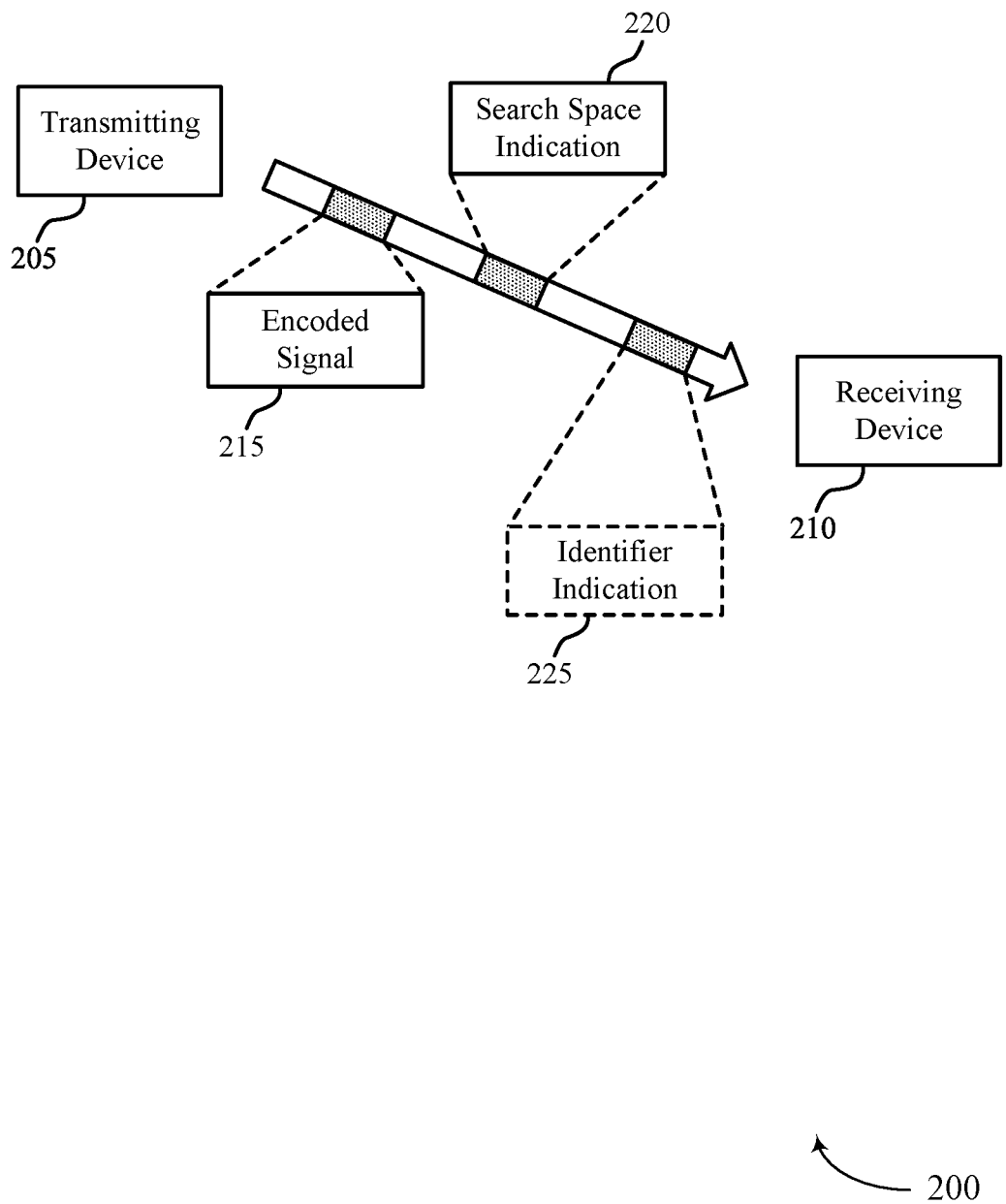
FIG. 2 shows an example signaling diagram that supports early termination of blind decoding with rateless coding.

FIG. 2 shows an example signaling diagram 200 that supports early termination of blind decoding with rateless coding. The signaling diagram 200 may implement or be implemented to realize aspects of the wireless communications system 100. For example, the signaling diagram 200 illustrates communication between a transmitting device 205 and a receiving device 210. A transmitting device 205 may be an example of any device capable of wireless communication and, as such, may be an example of a UE 115, one or more components of a BS 105, a TRP, a small cell, or a relay node, among other examples, which may perform one or more aspects of encoding and transmitting a message in accordance with examples as disclosed herein. A receiving device 210 may be an example of any device capable of wireless communication and, as such, may be an example of a UE 115, one or more components of a BS 105, a TRP, a small cell, or a relay node, among other examples, which may perform one or more aspects of receiving and decoding a message in accordance with examples as disclosed herein.

In some implementations, including when the described techniques are applied to downlink communications (such as PDCCH transmission), the transmitting device 205 may be an example of or otherwise function as one or more components of a BS 105 as illustrated by and described with reference to FIG. 1, and the receiving device 210 may be an example of or otherwise function as a UE 115 as illustrated by and described with reference to FIG. 1. In some implementations, a transmitting device 205 and a receiving device 210 may support a rateless coding scheme, such as a spinal coding scheme, and may set or configure an initial state, a seed value, or some other parameter associated with encoding or decoding to a value associated with an identifier of one or more intended receiving devices 210.

In some aspects, a transmitting device 205 may transmit, to a receiving device 210, a search space indication 220 indicating or configuring one or more search spaces (across one or more search space sets), which may indicate candidate resources for the receiving device 210 to monitor. In implementations associated with a PDCCH search space, such a search space may include or be otherwise associated with one or more PDCCH candidates over which the receiving device 210 may monitor for an encoded signal 215. In some scenarios, finding a PDCCH candidate including an encoded signal 215 out of a (potentially large) set of search spaces over time and frequency may be an expensive procedure at a receiving device 210 (such as in terms of time or latency, processing expense, or power consumption).

To ascertain, identify or determine whether a PDCCH transmission is intended for a receiving device 210, for instance, the receiving device 210 may extract or otherwise evaluate an RNTI from a downlink control information (DCI) packet included in the PDCCH transmission (such as an extraction associated with a completed decoding process for a PDCCH candidate). Such an extraction of an RNTI from a DCI packet included in a PDCCH transmission may include selection or detection over one or more (and potentially a large amount) of PDCCH candidates and, for some coding techniques, attempting an entire decoding process for each PDCCH candidate. For example, if a receiving device 210 uses a Polar decoder, the receiving device 210 may perform an entire modem process (such as an entire decoding process) for each PDCCH candidate that may potentially include a PDCCH transmission for the receiving device.

In some implementations, a transmitting device 205 and a receiving device 210 may support an encoding scheme and a decoding scheme, respectively, that enables or otherwise facilitates an early termination of a decoding process. For example, a transmitting device 205 and a receiving device 210 may employ a rateless coding scheme associated with or involving an initial state, a seed value, or some other parameter (such as a static or configured parameter) and may set or configure the initial state, the seed value, or the parameter to a value, such as an identifier, associated with an intended receiving device 210. As such, from a perspective of a receiving device 210, the receiving device 210 may attempt to decode a received transmission using a value for an initial state, a seed value, or some other parameter associated with the rateless coding scheme that is specific or unique to the receiving device 210 or to a group of receiving devices 210.

As such, if a transmitting device 205 encodes a transmission, such as a PDCCH transmission, using a first value associated with or identifying at least a first receiving device 210 as an initial state, a seed value, or some other parameter associated with a coding scheme, such as a rateless coding scheme, a second receiving device 210 associated with or identified by a second value may measure or calculate a relatively large decoding metric (such as a path cost) relatively early in a decoding attempt as a result of using the second value as the initial state, the seed value, or the other parameter associated with the coding scheme. In other words, because a transmitting device 205 may encode a transmission using a different value for an initial state, a seed value, or some other parameter associated with a coding scheme than a non-intended receiving device 210 may use for attempting to decode the transmission, the non-intended receiving device 210 may recognize a relatively large decoding metric (such as a relatively large path cost, or a decoding metric that exceeds a threshold) relatively early in the decoding attempt (such as within the first one, two, or three coding stages) and may terminate the decoding attempt early (such as after the first one, two, or three coding stages, and prior to going through all coding stages).

In some aspects, a transmitting device 205 may use an identifier, such as an RNTI, associated with an intended receiving device 210 as an initial state, a seed value, or some other parameter associated with a rateless coding scheme. For example, in scenarios in which a transmitting device 205 and a receiving device 210 employ a spinal coding scheme associated with an initial state, $s_0$, the transmitting device 205 (which may be an example of or otherwise function as one or more components of a BS 105) may set or configure each receiving device 210 (which may each be an example of a UE 115 monitoring for PDCCH transmissions from the transmitting device 205, sometimes referred to as a PDCCH UE) with its own unique RNTI as the initial state $s_0$ of a spinal encoding of PDCCH transmissions for the respective receiving device 210.

In other words, a transmitting device 205 may use an initial state $s_0 = RNTI_{UE\_1}$ for a PDCCH spinal encoder for a PDCCH transmission to a first receiving device 210 (such as a UE_1) and may use an initial state $s_0 = RNTI_{UE\_2}$ for the PDCCH spinal encoder for a PDCCH transmission to a second receiving device 210 (such as a UE_2). Each receiving device 210 may know which RNTI to search for in a given search space or set of search spaces and may likewise set $s_0 = RNTI_{UE}$ as the initial value in a decoding process. In some implementations, a transmitting device 205 may transmit, to each receiving device 210, an identifier indication 225 indicating or configuring that receiving device 210 with an identifying value or parameter, such as an RNTI. In some other examples, such a device identifier may be configured at or otherwise known to the receiving device 210, and the receiving device 210 may transmit an indication of such an identifier to the transmitting device 205 to support the described techniques for encoding transmissions to the receiving device 210.

As such, a receiving device 210 may monitor over a set of one or more candidates (such as PDCCH candidates, candidates in accordance with the search space indication 220) and may evaluate the candidates in accordance with attempting to decode an encoded signal 215 received over resources associated with the respective candidate using an initial state $s_0$ set to some identifying value associated with the receiving device, such as an RNTI. As part of the evaluation of the candidate, the receiving device 210 (such as a decoder of the receiving device 210) may check up to a threshold quantity $th_1$ of coding stages to calculate a decoding metric or path cost associated with the attempt to decode the encoded signal 215. In some aspects, the receiving device 210 may calculate a decoding metric or path cost in accordance with Equation 10 (shown herein).

If the receiving device 210 calculates a decoding metric or path cost that fails to satisfy a threshold decoding metric or path cost (such as a path cost at the threshold quantity $th_1$ of coding stages), such that the decoding metric or path cost is greater than the threshold decoding metric or path cost (path cost>$th_2$), the receiving device 210 may skip a remainder of the decoding process and may discard the candidate (such as discarding or ignoring a PDCCH candidate) over which the encoded signal 215 is received. For example, each receiving device 210 may have a unique identifying value, such as a unique RNTI, thus starting a decoding process using a wrong $s_0$ (such as a wrong RNTI) may cause the decoding metric or path cost to expand and a receiving device 210 may prune an entire decoding tree (as all paths may be associated with decoding metrics or path costs above the threshold decoding metric or path cost $th_2$).

Alternatively, if the receiving device 210 calculates a decoding metric or path cost that satisfies a threshold decoding metric or path cost (such as a path cost at the threshold quantity $th_1$ of coding stages), such that the decoding metric or path cost is less than the threshold decoding metric or path cost (path cost<$th_2$) at some stage of a decoding process or spinal decoder (as the path cost may be an accumulated value over multiple stages of the decoding process), the receiving device 210 may proceed with attempting to decode the encoded signal 215 across a remainder of the decoding process. For example, if a receiving device 210 tries or attempts a decoding process with a correct $s_0$ (such as a correct RNTI), the path cost calculated by the receiving device 210 may be kept low (for at least some decoding hypotheses) because generated symbol values at the receiving device 210 (which may be generated in accordance with or based on one or more decoding hypotheses) may be relatively close to, proximate to, or otherwise similar to symbol values actually transmitted by the transmitting device 205. A receiving device 210 may similarly evaluate each other candidate associated with the search space indication 220 and, accordingly, the receiving device 210 may save latency and complexity of candidate decoding over an entire search space (such as reducing latency or complexity associated with evaluating PDCCH candidates over a PDCCH search space).

In some aspects, one or more values for one or both of $th_1$ and $th_2$ may be pre-configured at a transmitting device 205 and a receiving device 210. Additionally, or alternatively, one or more values for one or both of $th_1$ and $th_2$ may be signaled between the transmitting device 205 and the receiving device 210. For example, the transmitting device 205 or the receiving device 210 may transmit an indication of values for $th_1$ or $th_2$, or both, to the other of the transmitting device 205 or the receiving device 210.

Figure 3:
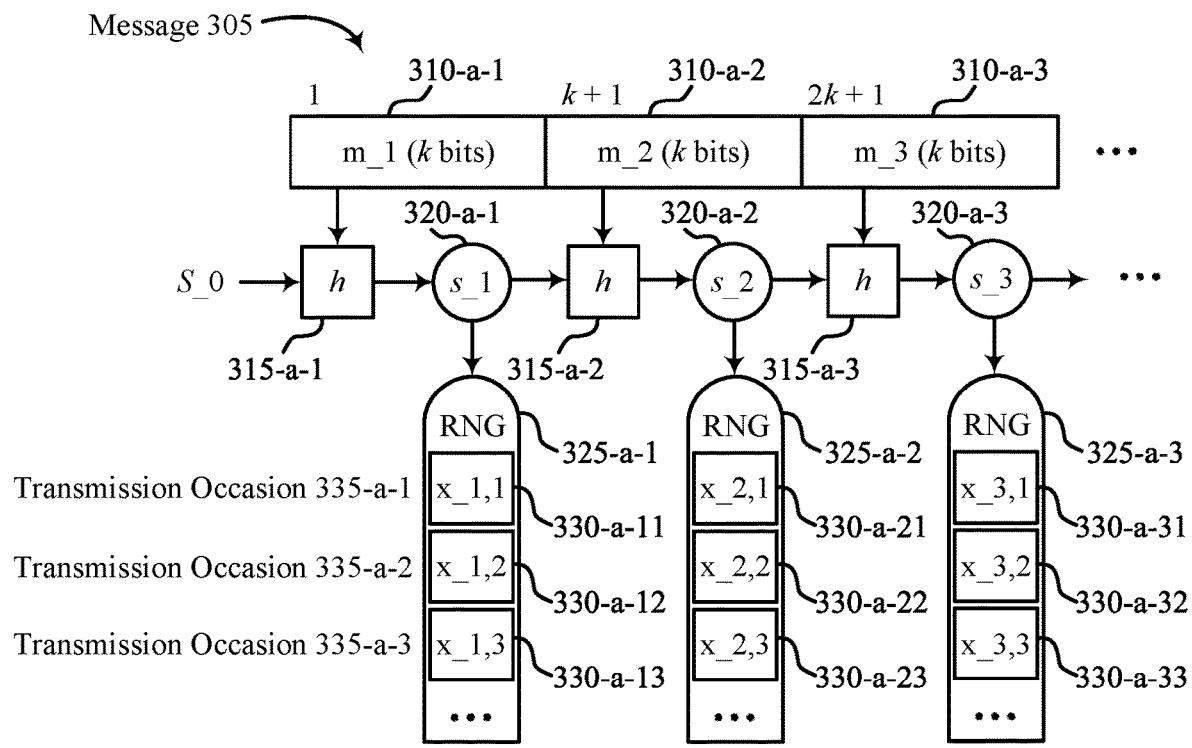
FIG. 3 shows an example rateless coding scheme that supports early termination of blind decoding with rateless coding.

FIG. 3 shows an example rateless coding scheme 300 that supports early termination of blind decoding with rateless coding. The rateless coding scheme 300 may be implemented to realize aspects of the wireless communications system 100 and the signaling diagram 200. For example, the rateless coding scheme 300 illustrates a sequential or cumulative coding of a message 305, such as a sequential or cumulative encoding of message segments 310. In some implementations, an encoder of a transmitting device 205 may employ the rateless coding scheme 300 to encode the message 305 and may transmit the encoded message 305 over one or more resource candidates in a manner that supports early termination of a decoding process at a receiving device 210 if the message 305 is not intended for that receiving device 210. For example, the message 305 may refer to one or more instances of DCI that may be transmitted over resources of a PDCCH, where such resources may be included in a set of candidate resources of a PDCCH search space.

The rateless coding scheme 300 may be an example of a spinal code encoding scheme or may otherwise illustrate spinal coding. Spinal codes may be a class of rateless codes that are compatible with time-varying channel conditions in a natural or simple way without use of an explicit bit rate selection. In other words, rateless coding, such as spinal coding, may be associated with an absence or lack of explicit signaling for bit rates of a transmission. For example, communicating devices may refrain from transmitting an indication of one or more aspects of an MCS while implementing rateless coding. Instead, a transmitting device 205 may use rateless codes, such as spinal codes, to perform an initial transmission of a message 305 at a high bit rate (such as a relatively highest bit rate) and, if one or more NACKs associated with the message 305 are received from a receiving device 210, to perform iterative transmission of additional information associated with the message via one or more additional transmissions (such as retransmissions), which may lower an effective bit rate until the receiving device 210 is able to successfully decode the message (such as until the transmitting device 205 receives an ACK associated with the message 305). In some aspects, such use of spinal codes may result in the transmitting device 205 performing the initial transmission at a higher rate than a channel over which the transmitting device 205 performs the transmission is able to sustain and the iterative additional transmissions (such as the iterative retransmissions) may gradually or progressively reduce the bit rate until the reduced bit rate is sustained by the channel (as may be evidenced by reception of an ACK).

In accordance with encoding techniques that implement spinal codes, a transmitting device 205 may perform the encoding of the message 305 once (which may be associated with a single generation of spines 320 for a given message 305) and may change a bit rate (which also may be referred to as a rate or as a channel rate) through some quantity of channel uses. On the other hand, in some other coding schemes, a transmitting device 205 may change a bit rate of a signal via a re-encoding of the signal (such that changing a rate may be considered as re-encoding data associated with the signal). As part of the rateless coding scheme 300, a transmitting device 205 may apply a hash function 315 (such as a random hash function) sequentially or cumulatively to bits of a message 305 (such as segments or portions of the message 305) to produce a sequence of coded bits and symbols (such as modulation symbols) for transmission. In some aspects, the transmitting device 205 may employ the encoding such that two input messages that differ in even one bit lead to different coded sequences after a point at which the two input messages differ, which may provide resilience to noise or bit errors.

As such, the rateless coding scheme 300 (a spinal coding scheme) may involve or pertain to a cumulative or sequential encoding of a message 305 across a set of message segments 310. For example, as part of the rateless coding scheme 300, a transmitting device 205 may partition or segment the message 305 into a set of message segments 310 and may cumulatively encode the message 305 across multiple stages of the rateless coding scheme 300 (each stage involving an encoding with an additional next message segment 310). In some aspects, a message 305 may include a quantity of n bits and a transmitting device 205 may partition or segment the message 305 into a set of message segments 310 such that each message segment includes k bits. In various implementations, k may be the same for each message segment 310 or may be different for some message segments 310 (such that some message segments 310 may include different quantities of bits than other message segments 310). In some aspects, and in accordance with the rateless coding scheme 300 being associated with a lack of an explicit bit rate selection, the rateless coding scheme 300 may be associated with a non-selection (by communicating devices) of the k and n parameters (as the k and n parameters may influence the bit rate of the message 305). The set of message segments 310 may accordingly include a quantity of n/k message segments 310.

For example, a transmitting device 205 may partition the message 305 into a message segment 310-a-1 (which may be referred to or denoted as a message segment $m_1$ or m_1) starting at bit 1 of the message 305, a message segment 310-a-2 (which may be referred to or denoted as a message segment $m_2$ or m_2) starting at bit k+1 of the message 305, a message segment 310-a-3 (which may be referred to or denoted as a message segment $m_3$ or m_3) starting at bit 2k+1 of the message 305, and so on for each message segment 310-a of the message 305. An encoder of the transmitting device 205 may include, for each stage of the rateless coding scheme 300, a hash function 315 and a numeric transposition function, such as a random number generator (RNG) 325 or other scrambling function. The hash functions 315 and the RNGs 325 of the rateless coding scheme 300 may be known to both a transmitting device 205 and a receiving device 210. For example, the hash functions 315 and the RNGs 325 may be pre-configured (such as pre-loaded) at both a transmitting device 205 and a receiving device 210, or one or more aspects or configurations of such functions may be signaled between a transmitting device 205 and a receiving device 210. In some aspects, an encoder of a transmitting device 205 or a decoder of a receiving device 210, or both, may combine a hash function 315 with an RNG 325 into a single or same processing block. Moreover, although each instance of a hash function 315 and each instance of an RNG 325 are illustrated separately, in some implementations, the separately illustrated instances of a hash function 315, or an RNG 325, or both may be performed by a same set of functional instructions, or by a same set of processing circuitry, which may be performed with different inputs to provide different outputs.

A transmitting device 205 may implement a hash function 315 with two inputs including a spine 320 (which may be referred to as an encoded value and may be an example of a v bit state) and a message segment 310 (which may include a portion, chunk, or quantity of k bits of the message 305) and may obtain, as an output of a hash function 315, a new spine 320 (a new encoded value or a new v bit state). Thus, a hash function 315 may take a first input (a spine 320) of size v bits and a second input (a message segment 310) of size k bits and may output a spine 320 of size v bits. A hash function 315 may be represented by Equation 1 and a value of a spine 320 may be represented by Equation 2, where an index i may refer to or indicate a coding index or stage (such as an encoding stage or a decoding stage) and $\overline{m}_i$ may refer a message segment 310 corresponding to that coding index or stage i. In some aspects, $s_0$ (or s_0) may be an initial input spine 320 or some other initial value and may be set equal to zero, or to some other default or pre-configured value. Additionally, or alternatively, a transmitting device 205 and a receiving device 210 may coordinate (such as via an exchange of one or more signals) on a value of $s_0$. In some implementations, for example, a transmitting device 205 may set or configure a value of $s_0$ to be equal to an identifying value or parameter associated with an intended receiving device 210, such as an RNTI, which may support various techniques for partial decoding of a search space by various receiving devices 210 in accordance with examples as disclosed herein. In some aspects, an output of a hash function 315 may include 32 bits (such that v=32).

$$h: \{0,1\}^v \times \{0,1\}^k \to \{0,1\}^v \quad (1)$$

$$s_i = h(s_{t-1}, \overline{m}_i) \quad (2)$$

A transmitting device 205 may generate a spine 320 of v bit states by sequentially or cumulatively hashing together groups of k bits from the input message 305 and, in some implementations, may refrain from adding any redundancy bits (as may be added for some other coding schemes). For example, a transmitting device 205 may obtain a spine 320-a-1 as an output of a hash function 315-a-1, may obtain a spine 320-a-2 as an output of a hash function 315-a-2, and may obtain a spine 320-a-3 as an output of a hash function 315-a-3. Further, in some aspects, a transmitting device 205 may use or otherwise reach a hash function 315 with a low probability of hash collisions (in part as a result of the sequential or cumulative hashing of groups or segments of k bits from the input message 305).

The transmitting device 205 may generate a spine 320 for each message segment 310 and may use each of the n/k spines 320 as a seed or input into a respective instance of an RNG 325. A spine 320 may include or otherwise convey information associated with a message segment 310 of a same coding indices or stage as well as information associated with message segments 310 of preceding coding indices or stages. For instance, the spine 320-a-1 may include or otherwise convey information associated with the message segment 310-a-1 (and a seed value S_0, such as a device identifier, where applicable), the spine 320-a-2 may include or otherwise convey information associated with the message segment 310-a-1 and the message segment 310-a-2, and the spine 320-a-3 may include or otherwise convey information associated with the message segment 310-a-1, the message segment 310-a-2, and the message segment 310-a-3.

As such, a last or final spine 320 may include encoded information associated with the entire message 305 and a transmitting device 205 may, in some scenarios, transmit a signal associated with the last spine 320 (and suppress transmission of signals associated with other spines 320) to achieve an upper limit bit or channel rate (because the transmission of the signal associated with the last spine 320 may convey the entire message 305 via a single channel use). Such scenarios in which the transmitting device 205 exclusively transmits a signal associated with the last spine 320 may include scenarios of a relatively high SNR (such as an SNR greater than a threshold SNR or a theoretically infinite SNR) or scenarios associated with a relatively high constellation order (such as a constellation order greater than a threshold constellation order).

Each instance of an RNG 325, in accordance with receiving a spine 320 as an input, may output a symbol value 330 (such as a sequence of c-bit numbers or a sequence of c bits). As such, an RNG 325 may take a value of a spine 320 as an input (having a size of v bits) and may apply some numeric transposition function ℕ to the value of the spine 320. Such a numeric transposition function ℕ may be an RNG, a pseudo-random RNG, a mapping function, a scrambling function, a scaling function, or any combination thereof. In some aspects, an RNG 325 may be represented by Equation 3.

$$\text{RNG: } \{0,1\}^v \times \mathbb{N} \to \{0,1\}^c \quad (3)$$

In some implementations, a symbol value 330 may be an example of, or may be otherwise associated with (such as mapped to) one or more modulation symbols, such as an in-phase and quadrature (IQ) constellation symbol or point, or other types of modulation symbols, such as a pulse-amplitude modulation (PAM) symbol. In some aspects, an IQ constellation symbol may be or may be associated with two orthogonal PAM symbols. In some other implementations, the transmitting device 205 may convert a symbol value 330 into an IQ constellation symbol or point (such as via an IQ constellation mapping function). In implementations in which the transmitting device 205 converts a symbol value 330 into an IQ constellation symbol or point, the transmitting device 205 may use an IQ constellation mapping function to generate a transmitted symbol (such as a constellation symbol or a modulation symbol) from an output of an RNG 325. In such implementations, a transmitting device 205 may use the IQ constellation mapping function to map each symbol value 330 to a (different) modulation symbol (which may be equivalently referred to herein as a constellation symbol or point). Thus, the rateless coding scheme 300 may illustrate an example implementation that includes a combination of an encoding operation and a modulation operation (such as a scheme where encoding and modulation are performed jointly, or a rateless encoding and modulation scheme, or a rateless modulation and coding scheme). However, the described techniques may implement other schemes where encoding and modulation are performed jointly, including schemes associated with coding indices corresponding to a cumulative encoding of different quantities of message segments 310. In some aspects, and because a receiving device 210 may jointly decode over all received symbols, any mapping may be suitable or compatible with the rateless coding scheme 300. Additional details relating the mapping of symbol values 330 to modulation symbols are illustrated by and described in more detail with reference to FIG. 4.

In some aspects, a transmitting device 205 may generate an in-phase (I) value, such as a real component, and a quadrature (Q) value, such as an imaginary component, in accordance with or under an average power constraint P. For example, if b is a symbol value 330 (a c-bit output) from an RNG 325, the transmitting device 205 may generate an I value and a Q value in accordance with Equations 4-7.

$$u = \frac{b + 0.5}{2^c} \qquad (4)$$

$$\text{Uniform}: b \to (u - 0.5) \cdot \sqrt{6P} \qquad (5)$$

$$\text{Truncated Gaussian's}: b \to \Phi^{-1}(\gamma + (1 - 2\gamma)u)\sqrt{P/2} \qquad (6)$$

$$\gamma \equiv \Phi(-\beta) \text{ limits the Gaussian's range to } \pm \beta\sqrt{P/2} \qquad (7)$$

In some implementations, a transmitting device 205 may achieve higher bit rates (without increasing a decoding cost) via a puncturing of the transmitted symbols at the transmitter side, where such transmission puncturing may refer to various techniques for performing transmissions associated with a subset of the spines 320 for a given message 305, such as refraining from performing transmissions associated with one or more spines 320 for at least in an initial transmission associated with the given message 305. For example, a transmitting device 205 may transmit one or more signals associated with one or more specific spines 320 over a set of transmission occasions 335 in accordance with a transmission puncturing scheme. The transmission puncturing scheme may define or otherwise indicate which one or more spines 320 a transmitting device 205 is to transmit at each of the set of transmission occasions 335. For example, a transmitting device 205 may transmit a signal associated with the spine 320-*a*-3 during a transmission occasion 335-*a*-1, may transmit a signal associated with the spine 320-*a*-2 during a transmission occasion 335-*a*-2, and may transmit a signal associated with the spine 320-*a*-1 during a transmission occasion 335-*a*-3, where applicable.

Further, and as shown in the rateless coding scheme 300, a transmitting device 205 may obtain various symbol values 330 from each RNG 325 depending on a transmission occasion 335. For example, the RNG 325-*a*-1 may output, for the input spine 320-*a*-1, a symbol value 330-*a*-11 (as illustrated by or denoted as an $x_{1,1}$ or x_1,1 value) for the transmission occasion 335-*a*-1, a symbol value 330-*a*-12 (as illustrated by or denoted as an $x_{1,2}$ or x_1,2 value) for the transmission occasion 335-*a*-2, and a symbol value 330-*a*-13 (as illustrated by or denoted as an $x_{1,3}$ or x_1,3 value) for the transmission occasion 335-*a*-3. The RNG 325-*a*-2 may output, for the input spine 320-*a*-2, a symbol value 330-*a*-21 (as illustrated by or denoted as an $x_{2,1}$ or x_2,1 value) for the transmission occasion 335-*a*-1, a symbol value 330-*a*-22 (as illustrated by or denoted as an $x_{2,2}$ or x_2,2 value) for the transmission occasion 335-*a*-2, and a symbol value 330-*a*-23 (as illustrated by or denoted as an $x_{2,3}$ or x_2,3 value) for the transmission occasion 335-*a*-3. The RNG 325-*a*-3 may output, for the input spine 320-*a*-3, a symbol value 330-*a*-31 (as illustrated by or denoted as an $x_{3,1}$ or x_3,1 value) for the transmission occasion 335-*a*-1, a symbol value 330-*a*-32 (as illustrated by or denoted as an $x_{3,2}$ or x_3,2 value) for the transmission occasion 335-*a*-2, and a symbol value 330-*a*-33 (as illustrated by or denoted as an $x_{3,3}$ or x_3,3 value) for the transmission occasion 335-*a*-3. Although a symbol value 330 is illustrated for each spine 320 at each transmission occasion 335, a transmitting device 205 may refrain from generating those symbol values 330 that are not configured or scheduled for transmission, such as those spines 320 that have been punctured by a transmission puncturing scheme for a given transmission occasion 335.

As such, if the transmitting device 205 transmits a signal associated with the spine 320-*a*-3 during the transmission occasion 335-*a*-1, transmits a signal associated with the spine 320-*a*-2 during the transmission occasion 335-*a*-2, and transmits a signal associated with the spine 320-*a*-1 during the transmission occasion 335-*a*-3, the transmitting device 205 may transmit a signal associated with the symbol value 330-*a*-31 during the transmission occasion 335-*a*-1, may transmit a signal associated with the symbol value 330-*a*-22 during the transmission occasion 335-*a*-2, and may transmit a signal associated with the symbol value 330-*a*-13 during the transmission occasion 335-*a*-3. Each transmission, which may collectively be associated with or based on a transmission puncturing scheme, may use any modulation constellation, such as any one or more of a quadrature amplitude modulation (QAM) constellation, a non-square constellation, or a Gaussian constellation, among other examples.

Figure 4:
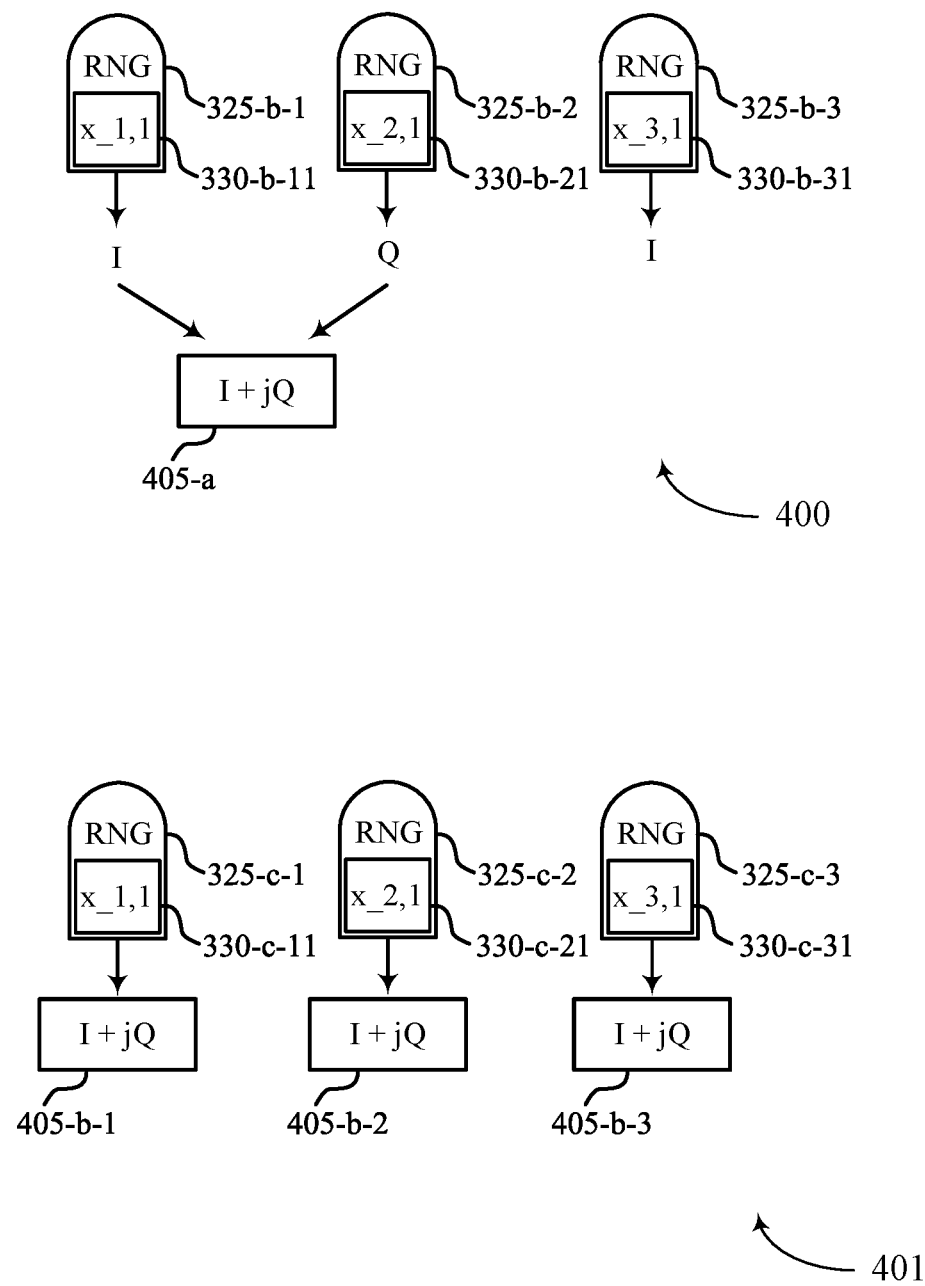
FIG. 4 shows example mapping functions that support early termination of blind decoding with rateless coding.

FIG. 4 shows example mapping functions 400 and 401 that support early termination of blind decoding with rateless coding. The mapping functions 400 and 401 may be implemented to realize aspects of the wireless communications system 100 or the signaling diagram 200. For example, the mapping functions 400 and 401 illustrate a mapping or conversion from a symbol value 330 (an output of an RNG 325) to a modulation symbol 405 (which may be equivalently referred to herein as a constellation symbol or a constellation point). In some implementations, an encoder of a transmitting device 205 may employ the mapping functions 400 and 401 to map encoded portions or segments of a message 305 to modulation symbols 405 to facilitate a mapping to communication resources over which the transmitting device 205 may transmit one or more signals associated with the encoded portions or segments.

In some implementations, and as shown by the mapping function 400, a transmitting device 205 may map a modulation symbol 405 with two spines 320, such as mapping a modulation symbol 405 with the output of two RNGs 325, where a first output may be mapped along a first axis of a modulation scheme (such as a real component or an in-phase component of modulation scheme) and a second output may be mapped along a second axis of the modulation scheme (such as an imaginary component or a quadrature component of the modulation scheme). For example, the mapping function 400 illustrates an RNG 325-*b*-1, an RNG 325-*b*-2, and an RNG 325-*b*-3 (each of which may take, as an input, a different spine 320), and the RNG 325-*b*-1 may output a symbol value 330-*b*-11, the RNG 325-*b*-2 may output a symbol value 330-*b*-21, and the RNG 325-*b*-3 may output a symbol value 330-*b*-31. In some aspects, at least some of the symbol values 330-*b* obtained as outputs from the RNGs 325-*b* may be associated with a same transmission occasion 335, such as a transmission occasion associated with transmission of the modulation symbol 405-*a*.

In accordance with the mapping function 400, a transmitting device 205 may map the symbol value 330-*b*-11 to a real portion (such as an I value) of the modulation symbol 405-*a*, and map the symbol value 330-*b*-21 to an imaginary portion (such as a Q value) of the modulation symbol 405-*a*. In some implementations, such as if a spine 320 associated with the RNG 325-*b*-3 is scheduled or configured for a transmission, the transmitting device 205 may map the symbol value 330-*b*-31 to a real portion (such as an I value) of another modulation symbol 405 (not shown), which may be associated with a same transmission occasion 335 or a different transmission occasion 335 than the modulation symbol 405-*a*. Although shown as mapping symbol values 330 in an order of real first, imaginary second (such that a relatively earlier of two spines 320 or symbol values 330 maps to an I value and a relatively later of the two spines 320 or symbol values 330 maps to a Q value), a transmitting device 205 also may map symbol values 330 in an order of imaginary first, real second (such that a relatively earlier of two spines 320 or symbol values 330 maps to a Q value and a relatively later of the two spines 320 or symbol values 330 maps to an I value).

In some implementations, and as shown by the mapping function 401, a transmitting device 205 may map a modulation symbol 405 with one spine 320, such as mapping a modulation symbol 405 with the output of one RNG 325, where the output may be mapped as a combination of a first axis of a modulation scheme (such as a real component of a modulation scheme) and a second axis of the modulation scheme (such as an imaginary component of the modulation scheme). For example, the mapping function 401 illustrates an RNG 325-*c*-1, an RNG 325-*c*-2, and an RNG 325-*c*-3 (each of which may take, as an input, a different spine 320) and the RNG 325-*c*-1 may output a symbol value 330-*c*-11, the RNG 325-*c*-2 may output a symbol value 330-*c*-21, and the RNG 325-*c*-3 may output a symbol value 330-*c*-31. In various examples, the symbol values 330-*c* obtained as outputs from the RNGs 325-*c* may be associated with a same transmission occasion 335, or different transmission occasions 335. In accordance with the mapping function 401, a transmitting device 205 may map the symbol value 330-*c*-11 to both a real portion (such as an I value) and an imaginary portion (such as a Q value) of a modulation symbol 405-*b*-1. In some implementations, such as when a respective spine 320 associated with the RNG 325-*c*-2 or the RNG 325-*c*-3 is scheduled or configured for a transmission, the transmitting device 205 may map the symbol value 330-*b*-31 to a real portion and an imaginary portion of a modulation symbol 405-*b*-2, or map the symbol value 330-*c*-31 to a real portion and an imaginary portion of a modulation symbol 405-*b*-3, either or both of which may be associated with a same transmission occasion 335 or a different transmission occasion 335 than the modulation symbol 405-*b*-1.

In an example of the mapping function 400, for n=256, k=4, and c=6, and using 64 PAM per spine 320 and 4096 QAM per channel use, a transmitting device 205 may start with R=8 bits per channel use (such as if transmitting all spines without puncturing). In an example of the mapping function 401, for n=256, k=4, and c=12 and using 4096 QAM per spine 320 and per channel use, a transmitting device 205 may start with R=4 bits per channel use (such as if transmitting all spines without puncturing). Thus, in an implementation of the mapping function 400 according to which a transmitting device 205 transmits one of either a real part or an imaginary part per spine 320, the transmitting device 205 may double an effective instantaneous rate (an effective bit rate or channel rate) for a same constellation mapping.

Figure 5:
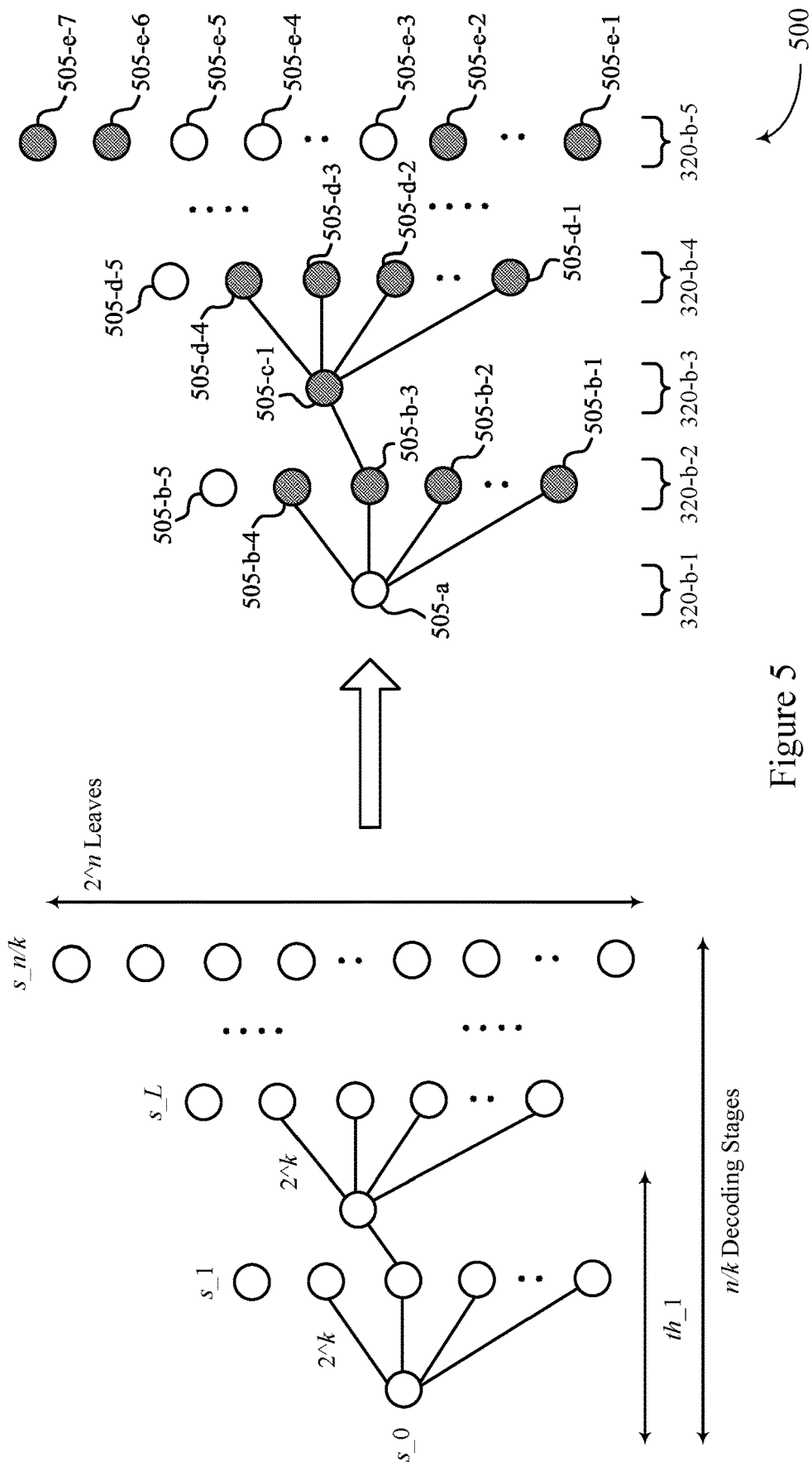
FIGS. 5 and 6 show example decoding schemes that support early termination of blind decoding with rateless coding.

FIG. 5 shows an example decoding scheme 500 that supports early termination of blind decoding with rateless coding. The decoding scheme 500 may be implemented to realize aspects of the wireless communications system 100 or the signaling diagram 200. For example, the decoding scheme 500 illustrates a decoding process at a receiving device 210 for decoding signals associated with a rateless code, such as a spinal code. In some aspects, the decoding scheme 500 may illustrate an example implementation that includes a combination of an decoding operation and a demodulation operation (such as a scheme where decoding and demodulation are performed jointly, or a rateless decoding and demodulation scheme, or a rateless demodulation and decoding scheme). However, the described techniques may implement other schemes where decoding and demodulation are performed jointly, including schemes associated with coding indices corresponding to a cumulative encoding of different quantities of message segments 310.

In some implementations, a receiving device 210 may receive a signal associated with a message 305 encoded according to a rateless coding scheme (such as a spinal coding scheme) and may employ a cost function associated with a Euclidean distance between a channel measurement associated with the signal and each of a set of candidate symbol values 505 multiplied by the channel (or an estimated channel). In other words, the cost function may be associated with a Euclidean distance between a received signal and a product of each of the candidate symbol values 505 and the channel (or the estimated channel). In some implementations, the decoding scheme 500 may be implemented to evaluate candidates of a search space, such as evaluating a PDCCH search space for control information intended for a receiving device 210 or set of receiving devices 210.

In some aspects, a maximum likelihood (ML) decoder may generate a set of (such as all) codewords out of a size n (such that a total quantity of codewords is $2^n$) and may calculate a distance between generated symbol values (such as symbol values 330) at the receiver and actually received (noisy) symbol values per codeword. In such aspects, the decoder may infer, ascertain, or otherwise determine that the decoded message is the one with a minimal distance over all received symbol values 330 or spines 320. In other words, given a vector of observations $\bar{y}$ and an encoder function $\bar{x}(M')$ that yields the vector of transmitted symbol values or spines 320 for a message M', the ML rule may be defined in accordance with Equation 8.

$$\hat{M} \in \underset{M' \in \{0,1\}^n}{\operatorname{argmin}} \|\bar{y} - \bar{x}(M')\|^2 \qquad (8)$$

In some implementations of the present disclosure, a receiving device 210 may employ a decoder scheme, which may be referred to as a bubble decoder or a list decoder, that is able to achieve lower computational complexity and leverage aspects associated with rateless coding (such as spinal coding). For example, because a spinal encoder may apply a hash function 315 sequentially or cumulatively across multiple message segments 310, input messages with a common prefix also may have a common spine value (such as a common spine prefix or a common value of a spine 320 conveying information associated with the common prefix), whereas symbol values 330 produced or output by an RNG 325 from the common spine values may or may not be identical. As such, a receiving device 210 may use this structure to decompose a total distance into a summation over spines 320. For example, a receiving device 210 may break y into sub-vectors $\bar{y}_1 \ldots \bar{y}_{n/k}$, which may represent the symbols from spines values $s_i$ of a correct message (as well as for $\hat{x}(M')$). With such a representation of y as sub-vectors $\hat{y}_1 \ldots \hat{y}_{n/k}$, the cost function may be defined in accordance with Equation 9.

$$\|\bar{y} - \bar{x}(M')\|^2 = \sum_{i=1}^{n/k} \|\bar{y}_i - \bar{x}_i(s'_i)\|^2 \qquad (9)$$

Accordingly, a receiving device 210 may calculate a summation for a set of (such as all) transmissions or candidates that share a same spine value $s_i$ (such as $s_0$, which may be associated with a device identifier). Thus, in some implementations, a receiving device 210 may implement a decoding process as a tree decoding with a root at spine $s_0$. The receiving device 210 may sum or accumulate branch costs on a path from the root to a node and calculate a path cost (which may be referred to as a path metric or a decoding metric) of the node using Equation 9.

In accordance with the cost function shown by Equation 9, and supposing, as an example, an ML message M* and some other message M' that differ in an $i^{th}$ bit, spines 320 including and after a spine index of ceil(i/k) may be dissimilar (and all other symbols before a spine index of ceil(i/k) may be the same across the two transmissions) such that the difference between the two decoded transmissions is present in the last O(log n) bits. As such, the earlier the error in M', the larger the path cost may be. If a receiving device 210 constructs an entire ML decoding tree and computes path costs for each of the nodes (which may be referred to as leaves), the receiving device 210 may select a best B nodes (such as the B nodes or leaves having the lowest path cost) and may trace back through the decoding tree to find that each of the B selected nodes converge to a relatively small number of common "ancestors," where an "ancestor" may refer to a node of a decoding tree relatively closer to a root of the tree than the B selected nodes and where a common "ancestor" may refer to a node from which each of the B selected nodes can be traced back to.

Thus, a receiving device 210 may implement a bubble decoder associated with a depth parameter d and a beam width parameter B and, instead of searching an entire decoding tree, the receiving device 210 may maintain B common ancestors (beams) and a partial decoding tree rooted at each ancestor of depth d. In some implementations, the receiving device 210 may select a node with a lowest path cost and may return a complete message corresponding to the selected node (such as a complete message conveyed by a spine 320 associated with the selected node of the decoding tree). Additionally, or alternatively, the receiving device 210 may perform a cyclic redundancy check (CRC) on a set of (such as all) left codewords, which may include a total of $B2^{kd}$ left codewords.

A width of the decoding tree may be associated with or given by the parameter k (such that the tree may expand by $2^k$ nodes or leaves at each stage). As such, the width of the decoding tree may decrease as k decreases and the decoding tree may correspondingly include more decoding stages (as a result of n/k increasing) as k decreases. Further, as the width of the decoding tree decreases and as a quantity of decoding stages increases, a latency until a next transmission (such as a next retransmission) may increase as well. Likewise, the width of the decoding tree may increase as k increases and the decoding tree may correspondingly include fewer decoding stages (as a result of n/k decreasing) as k increases. Further, as the width of the decoding tree increases and as a quantity of decoding stages decreases, a latency until a next transmission (such as a next retransmission) may decrease as well.

Accordingly, and as shown in the decoding scheme 500, a receiving device 210 may generate or otherwise use a decoding tree of n/k decoding stages or levels and $2^n$ leaves or nodes at a last or final decoding stage. A root of the decoding tree may be $s_0$ (or s_0) and may branch out to $2^k$ leaves at a first decoding stage associated with a spine $s_1$ (or s_1). Each leaf of the first decoding stage associated with the spine $s_1$ may branch out to $2^k$ leaves at a next decoding stage associated with a next spine, and eventually to a decoding stage associated with a spine $s_L$ (or s L). The decoding tree may end at a final decoding stage associated with a spine $s_{n/k}$ (or s_n/k).

In some implementations, a receiving device 210 may recognize that decoding hypotheses, which may be equivalently referred to as candidate symbol values 505, that have same initial states that share same symbol hypotheses or guesses (such as decoding hypotheses for nodes or leaves that have a common "ancestor" node in the decoding tree) are identical in a decoding stage associated with the same initial states that share the same symbol hypotheses or guesses. In other words, decoding stages up to the common "ancestor" node in the decoding tree may be the same for decoding hypotheses of later decoding stages that share the same symbol hypotheses or guesses for that common "ancestor" node. As such, the receiving device 210 may merge such initial identical states (and thus save some decoding complexity and computational cost).

Each of the leaves or nodes at each decoding stage of the decoding tree may correspond to decoding hypotheses or candidate symbol values 505 associated with an encoded message 305 at a receiving device 210. As part of the decoding scheme 500, for example, a receiving device 210 may generate a set of candidate symbol values 505 at each decoding stage corresponding to a spine 320 and may select one or more candidate symbol values 505 at each decoding stage or for each spine 320. For example, a receiving device 210 may evaluate a set of candidate symbol values 505 in accordance with a cost function associated with a distance (such as a Euclidean distance) between each of the set of candidate symbol values 505 and an actually received or measured symbol value and may select the one or more candidate symbol values 505 associated with the smallest cost functions (or the shortest Euclidean distances). The cost function may be defined in accordance with Equation 10.

$$cost_{L,i} = \sum_{i=1}^{L} |y_{i,j} - x_{i,j}(s_i)|^2 \qquad (10)$$

For example, the receiving device 210 may initialize or begin a decoding tree assuming a candidate symbol value 505-a associated with an $s_0$ value, which may be associated with a spine 320-b-1. In some aspects, $s_0$ may be a constant or static value, such as zero, or may be a value associated with an identifier of one or more devices.

The receiving device 210 may generate a set of candidate symbol values 505-b for a subsequent spine 320-b-2, including a candidate symbol value 505-b-1, a candidate symbol value 505-b-2, a candidate symbol value 505-b-3, a candidate symbol value 505-b-4, and a candidate symbol value 505-b-5. In some implementations, the receiving device 210 may generate the set of candidate symbol values 505-b by inputting, into a first hash function 315, the $s_0$ value and multiple first sets of k candidate bits (which may function as or be examples of possibilities for bits included in a first message segment 310, such as possible bit string values of a message segment 310-a-1 as shown in FIG. 3) and obtaining, as an output of the first hash function 315, a first set of candidate encoded values (such as a first set of candidate spine values for the spine 320-b-2). The receiving device 210 may input, into a first RNG 325, the first set of candidate encoded values (such as the first set of candidate spines) and obtain, as an output of the first RNG 325, the set of candidate symbol values 505-b for the spine 320-b-2. The receiving device 210 may compare each of the set of candidate symbol values 505-b to a channel measurement (for that spine 320-b-2, if transmitted) and may select B candidate symbol values 505-b that are associated with a smallest cost function or Euclidean distance relative to the channel measurement. As shown in the decoding scheme 500, B=4 (such that the receiving device 210 may select four candidate symbol values 505 for further consideration or evaluation).

The receiving device 210 may generate a set of candidate symbol values 505-c for a subsequent spine 320-b-3 (shown as including a single candidate symbol value 505-c for illustrative purposes). In some implementations, the receiving device 210 may generate the set of candidate symbol values 505-c by inputting, into a second hash function 315, a candidate spine value associated with the candidate symbol value 505-b-3 and multiple second sets of k candidate bits (which may function as or be examples of possibilities for bits included in a second message segment 310, such as possible bit string values of a message segment 310-a-2 as shown in FIG. 3) and obtaining, as an output of the second hash function 315, a second set of candidate encoded values (such as a second set of candidate spines for the spine 320-b-3). The receiving device 210 may input, into a second RNG 325, the second set of candidate encoded values (such as the second set of candidate spines) and obtain, as an output of the second RNG 325, the set of candidate symbol values 505-c. The receiving device 210 may compare each of the set of candidate symbol values 505-c to a channel measurement (of a modulation symbol for that spine 320-b-3, if transmitted) and may select B candidate symbol values 505-c that are associated with a smallest cost function or Euclidean distance relative to the channel measurement. As shown by the decoding scheme 500, the receiving device 210 may select the one candidate symbol value 505-c shown, potentially among other candidate symbol values 505-c associated with potential spine values for the spine 320-b-3.

The receiving device 210 may generate a set of candidate symbol values 505-d for a subsequent spine 320-b-4, including a candidate symbol value 505-d-1, a candidate symbol value 505-d-2, a candidate symbol value 505-d-3, a candidate symbol value 505-d-4, and a candidate symbol value 505-d-5. In some implementations, the receiving device 210 may generate the set of candidate symbol values 505-d by inputting, into a third hash function 315, a spine value associated with the candidate symbol value 505-c and multiple third sets of k candidate bits (which may function as or be examples of possibilities for bits included in a third message segment 310, such as possible bit string values of a message segment 310-a-3 as shown in FIG. 3) and obtaining, as an output of the third hash function 315, a third set of candidate encoded values (such as a third set of candidate spines 320 for a spine 320-b-4). The receiving device 210 may input, into a third RNG 325, the third set of candidate encoded values (such as the third set of candidate spines 320) and obtain, as an output of the third RNG 325, the set of candidate symbol values 505-d. The receiving device 210 may compare each of the set of candidate symbol values 505-d to a channel measurement (of a modulation symbol for that spine 320-b-4, if transmitted) and may select B candidate symbol values 505-d that are associated with a smallest cost function or Euclidean distance relative to the channel measurement.

The receiving device 210 may likewise generate other sets of candidate symbol values 505 until the receiving device 210 reaches an $n/k^{th}$ decoding stage associated with a spine 320-b-5, where the receiving device 210 may generate a set of candidate symbol values 505-e. The set of candidate symbol values 505-e may include a candidate symbol value 505-e-1, a candidate symbol value 505-e-2, a candidate symbol value 505-e-3, a candidate symbol value 505-e-4, a candidate symbol value 505-e-5, a candidate symbol value 505-e-6, and a candidate symbol value 505-e-7. The receiving device 210 may generate the set of candidate symbol values 505-e similarly to how the receiving device 210 generates the other sets of candidate symbol values 505 and may similarly select B candidate symbol values 505-e that are associated with a smallest cost function or Euclidean distance relative to a channel measurement (of a modulation symbol for that spine 320-b-5, if transmitted). In some aspects, the $n/k^{th}$ decoding stage associated with the spine 320-b-5 may be a final decoding stage associated with a final spine 320 (such that the spine 320-b-5 conveys information associated with the entire message 305). In such aspects, the receiving device 210 may measure, detect, or otherwise identify which of the candidate symbol values 505 is closest to the channel measurement and may infer that whichever candidate symbol value 505 is closest is associated with a correct decoding of the message 305.

In some implementations, a decoder of a receiving device 210 may calculate a Euclidean distance metric at each step or stage of the decoding scheme 500. For example, the decoder may implement an encoder block on each possible codeword with a length of n and, on each stage of the decoding scheme 500, may calculate a metric between a set of candidate symbol values 505 (a set of generated constellation symbols or points) relative to a received constellation symbol or point using Equation 10. A receiving device 210 may store or otherwise save the metric throughout (all of) the stages of the decoding scheme 500 (such as across a quantity of transmission occasions 335 associated with a given message 305) and may identify, notice, or otherwise determine that if a hash function 315 received two inputs that differ (even by one bit), an output of the hash function 315 may be different as a result of the properties of the hash functions 315. Thus, the calculated metric, which may be an example of a decoding metric, a path cost metric, or a value of the cost function, may be different as well. A receiving device 210 may calculate and save the path cost metric and the path cost metric may increase from a first (such as earliest) symbol, spine, or coding index at which the decoder of the receiving device 210 begins to diverge from an actually received or measured constellation symbol or point.

In accordance with examples as disclosed herein, characteristics of the decoding scheme 500 may be leveraged to improve various implementations of a search space, including identification of signals intended for a specific receiving device 210 or a specific set of receiving devices 210. For example, aspects of the decoding scheme 500 may be leveraged to support evaluations of a search space that enable an early termination of decoding operations on irrelevant signals, before such decoding is completed (such as rejecting a candidate before decoding is complete, rejecting a candidate without evaluating a decoded device identifier, rejecting a candidate before identifying a most-likely modulation symbol of a received signal for evaluating carried information). In implementations in which a receiving device 210 performs a decoding attempt on a signal received over a PDCCH candidate using an $s_0$ value set equal to an identifying value or parameter associated with the receiving device 210, such as an RNTI, the receiving device 210 may detect that the path cost metric increases (such as for all decoding hypotheses) at a relatively early symbol, spine, or coding index if the signal is not intended for the receiving device 210 (such as if the signal was encoded at a transmitting device 205 using a different $s_0$ value). Alternatively, the receiving device 210 may detect that the path cost metric remains low (for at least some decoding hypotheses) at a similarly relatively early symbol, spine, or coding index if the signal is intended for the receiving device 210. In some implementations, the receiving device 210 may calculate the path cost metric across a threshold quantity $th_1$ of coding stages and compare the calculated path cost metric to a threshold path cost metric $th_2$ after the $th_1$ coding stages, where $th_1$ may indicate a specific symbol, spine, or coding index or a quantity of symbols, spines, or coding indices.

In scenarios in which a receiving device 210 calculates a path cost metric greater than the threshold path cost metric $th_2$ after the $th_1$ coding stages (such that the path cost metric fails to satisfy a threshold), the receiving device 210 may skip a remainder of the coding stages of the decoding scheme 500. In some aspects, skipping a remainder of the decoding process may be referred to herein as an early termination of the decoding process, and may be associated with a refraining from or suppressing of performing tasks associated with remaining coding stages after the threshold quantity $th_1$ of coding stages. In scenarios in which a receiving device 210 calculates a path cost metric less than the threshold path cost metric $th_2$ after the $th_1$ coding stages (such that the path cost metric satisfies a threshold), the receiving device 210 may proceed with attempting to decode the signal across a remainder of the coding stages after the threshold quantity $th_1$ of coding stages.

Possible path cost metrics may vary in accordance with an SNR of a channel and at which stage of a decoder the path cost metrics are calculated, as well as in accordance with whether a receiving device 210 is using a correct (such as same or matching) $s_0$ value as was used to encode the transmitted signal received by the receiving device 210. Example path cost values (which may equivalently be referred to as path cost metrics) for an SNR of 30 dB at various spine stages (such as coding stages) are illustrated below by Tables 1 and 2 for use of a correct $s_0$ value (such as an RNTI_1) and for use of an incorrect $s_0$ value (such as an RNTI_2), respectively. Specifically, Table 1 illustrates example minimum path cost values and example mean (or average) path cost values for each of a number of spine stages in a scenario in which a receiving device 210 uses a same $s_0$ value as a transmitting device 205 used to encode a signal (which may be referred to as a correct $s_0$ value). Table 2 illustrates example minimum path cost values and example mean (or average) path cost values for each of a number of spine stages in a scenario in which a receiving device 210 uses a different $s_0$ value than a transmitting device 205 used to encode a signal (which may be referred to as an incorrect $s_0$ value).

The example mean or average path cost values shown in Tables 1 and 2 may represent mean or average values of a set (such as a subset) of path cost values associated with paths or sub-tress of a decoder having relatively or sufficiently small path costs. For example, the mean or average path cost values shown in Tables 1 and 2 may be mean or average path cost values of values associated with a subset of B sub-trees that a decoder may save for a given spine stage (such as for a given decoding stage). In some aspects, for instance, a receiving device 210 may save a subset of B sub-trees (and prune or refrain from saving information associated with any other sub-tree) at each spine stage (such as at each decoding stage), which may eliminate relatively large path cost values. The path cost values shown in Tables 1 and 2 may represent distances (such as Euclidean distances) between a channel measurement and a candidate symbol value 505, which may be unitless values in accordance with some distance calculation techniques.

For a given spine stage, the minimum path cost values shown in Table 1 may be relatively smaller than the minimum path cost values shown in Table 2 due to the use of a correct $s_0$ value as compared to the use of an incorrect $s_0$ value. For example, while both Table 1 and Table 2 illustrate accumulating path cost values over multiple spine stages, the minimum path cost values of Table 1 are less than the minimum path cost values of Table 2. For instance, at spine stage 0, the minimum path cost value if using a correct $s_0$ value may be a distance measurement of 0.004 while the minimum path cost value if using an incorrect $s_0$ value may be a distance measurement of 0.096. The path cost values for the mean or average for both Tables 1 and 2 may be relatively similar, as a receiving device 210 may similarly calculate path cost values for all other hypothesis code words at a decoder and may have a similar or same probability of not selecting a correct code word (as the receiving device 210 may randomly input spine values or bits into the hash function, or both). In other words, for both scenarios in which a receiving device 210 uses a correct $s_0$ value and scenarios in which a receiving device 210 uses an incorrect $s_0$ value, the receiving device 210 may (when looking at all other code words that will likely fail decoding, as the receiving device 210 spans the entire $2^k$ different inputs and only one of the $2^k$ different inputs may potentially be a correct input) calculate a same or similar path cost value on average. For example, because a receiving device 210 may try many possibilities that are irrelevant or otherwise not a correct path, such possibilities in aggregate may converge toward a same mean or average path cost regardless of whether the receiving device 210 uses a correct $s_0$ value or not.

TABLE 1

Using a Correct $s_0$ at Decoding
SNR = 30 dB

| Spine Stage | Minimum Path Cost Value | Mean Path Cost Value |
| --- | --- | --- |
| 0 | 0.004 | 2.027 |
| 1 | 0.005 | 4.650 |
| 2 | 0.011 | 5.709 |
| ... | ... | ... |
| 5 | 0.014 | 2.099 |
| 6 | 0.015 | 2.823 |
| 7 | 0.016 | 1.816 |
| ... | ... | ... |
| 10 | 0.017 | 2.330 |

TABLE 2

Using an Incorrect $s_0$ at Decoding
SNR = 30 dB

| Spine Stage | Minimum Path Cost Value | Mean Path Cost Value |
|---|---|---|
| 0 | 0.096 | 2.166 |
| 1 | 0.362 | 4.661 |
| 2 | 0.487 | 5.717 |
| ... | ... | ... |
| 5 | 0.642 | 2.470 |
| 6 | 0.826 | 3.247 |
| 7 | 0.883 | 2.228 |
| ... | ... | ... |
| 10 | 1.025 | 2.885 |

In implementations in which a receiving device 210 sets $s_0$ to a correct $s_0$ value, the receiving device 210 may select a path associated with a minimal path cost to attempt to decode the message. In some aspects, whether the attempt to decode the message is successful or not may depend on the SNR of the channel. A receiving device 210 may review mean or average path cost values when not choosing the minimal decoded word. In implementations in which a receiving device 210 sets $s_0$ to an incorrect $s_0$ value (as may be relevant for scenarios in which the receiving device 210 is able to perform early termination), the receiving device may calculate relatively high path cost values (such as path cost values greater than a threshold path cost) for each if not all decoded word options. For example, the receiving device 210 may calculate or measure a minimal path cost (which may be what the receiving device 210 assumes is a correct word) as well as other path cost values and may compare the minimal path cost with a threshold path cost (such as $th_2$).

Further, Tables 1 and 2 provide example minimum and mean path cost values and other example minimum and mean path cost values are also possible. Moreover, and as illustrated by Tables 1 and 2, minimum path cost values may tend to increase (as path cost may be an accumulated metric across multiple spine stages). Further, although some maximum path cost values may appear small, even such smaller maximum path cost values may be relatively large with respect to other path cost values calculated for that spine stage (including the minimal and selected value). For example, with a relatively higher SNR, a receiving device 210 may calculate a relatively smaller error vector from the received signal as compared to the generated candidate symbol values 505, potentially resulting in the accumulated path cost being relatively smaller for all possible codewords and spine stages. Alternatively, with a relatively lower SNR, a receiving device 210 may calculate a relatively larger error vector from the received signal as compared to the generated candidate symbol values 505, potentially resulting in the accumulated path cost being relatively larger for all possible codewords and spine stages. Thus, actual or example values for the values of the path cost metrics calculated by a receiving device 210 may be relative to SNR. Likewise, in some implementations, a path cost metric $th_2$ may vary per spine and per SNR. In some aspects, a receiving device 210 may configure the path cost metric $th_2$ in accordance with one or more simulations over a set of (such as a relatively large set of) potential path cost values for greater likelihood in successfully or accurately measuring or determining whether a received signal is meant for the receiving device 210.

Figure 6:
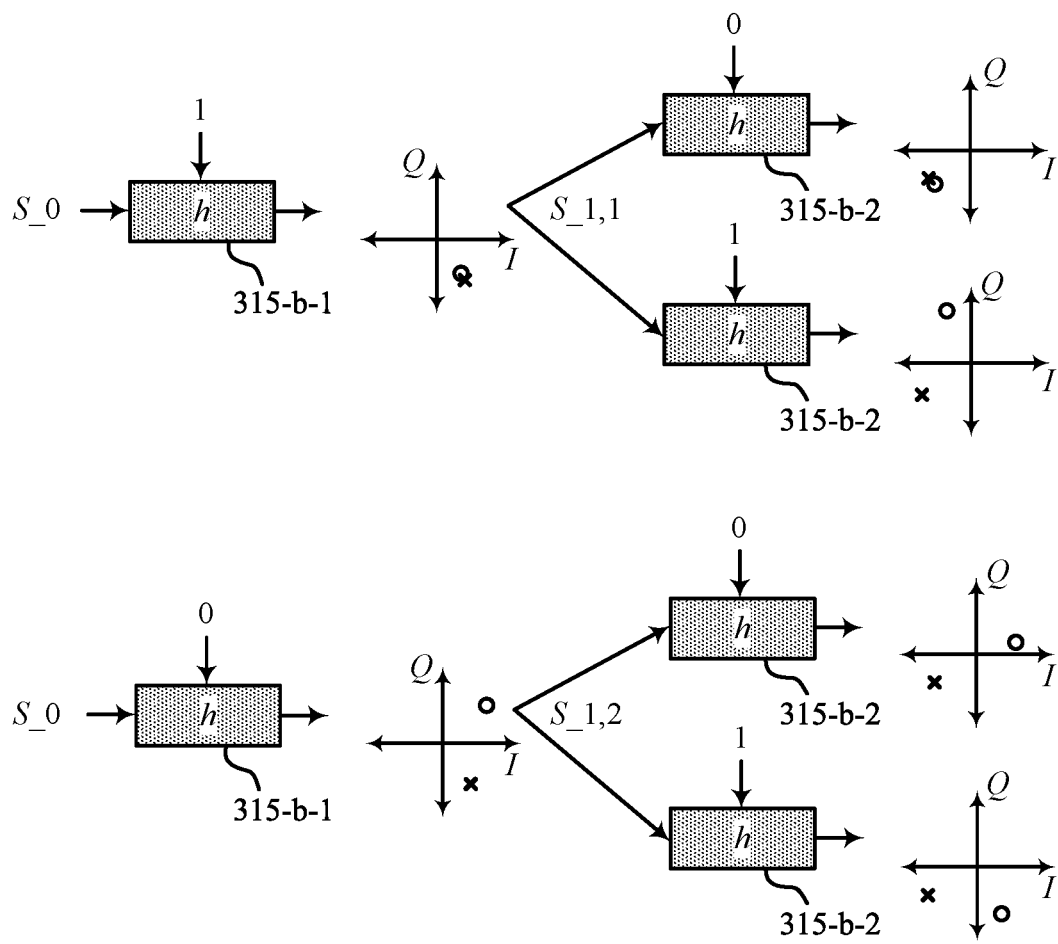

FIG. 6 shows an example decoding scheme 600 that supports early termination of blind decoding with rateless coding. The decoding scheme 600 may be implemented to realize aspects of the signaling diagram 200. For example, the decoding scheme 600 illustrates a decoding process at a receiving device 210 for decoding signals associated with a rateless code, such as a spinal code. In some implementations, a receiving device 210 may implement the decoding scheme 600 to identify which of a set of candidate symbol values 505 have a lowest path cost in accordance with which of the set of candidate symbol values 505 have a shortest distance (such as a shortest Euclidean distance) to a channel measurement 605. Further, in some implementations, a receiving device 210 may implement the decoding scheme 600 to identify whether all (or a threshold quantity of) candidate symbol values 505 have a path cost greater than a threshold path cost at a relatively early symbol, spine, or coding index and, if so, the receiving device 210 may perform an early termination of the decoding process (the receiving device 210 may assume that a signal was encoded using an $s_0$ value that is not associated with an identifying value or parameter of the receiving device 210).

For example, at each decoding stage or spine 320 of a decoder (such as a bubble decoder) at a receiving device 210, the receiving device 210 may compare each of a set of candidate symbol values 505 to a channel measurement 605 to identify one or more of the set of candidate symbol values 505 that have a shortest distance (such as a shortest Euclidean distance) to the channel measurement 605. The receiving device 210 may select the one or more of the set of candidate symbol values 505 that have the shortest distance as candidate symbol values 505 that are relatively more likely to be an actually transmitted symbol value 330 from a transmitting device 205 and may trim or focus a decoding tree, such as a decoding tree illustrated by the decoding scheme 500, to the selected one or more of the set of candidate symbol values 505 at that decoding stage or spine 320 of the decoder. In some aspects, a quantity of the one or more candidate symbol values 505 that a receiving device 210 selects at each decoding stage or spine 320 of the decoder may be equal to B, as described in more detail with reference to FIG. 6.

In some implementations, and as illustrated by the decoding scheme 600, a receiving device 210 may obtain, calculate, ascertain, or otherwise determine different candidate symbol values 505 in accordance with or as a result of inputting, into a hash function 315, different candidate bits or different spines 320 (such as different spine values), or both. In some aspects, a receiving device 210 may input a quantity of different candidate bits in accordance with a quantity of possible permutations of bits that may be included in or conveyed by a given message segment 310. For example, a receiving device 210 may input, into a hash function 315-*b*-1, $s_0$ (or s_0, which may be an example of an initial spine value or a seed value and, in some implementations, may be set equal to an identifying value or parameter of an intended receiving device 210, such as an RNTI of the intended receiving device 210) and candidate bit values of 1 or 0 in scenarios in which a message segment 310 includes or conveys one bit (such that k=1).

The receiving device 210 may receive, calculate, or otherwise obtain, from the hash function 315-*b*-1, two different candidate spines 320 in accordance with the two different candidate bit value inputs, may obtain two different candidate symbol values 505 using the two different candidate spine values as inputs into an RNG 325, and may map the two different candidate symbol values 505 to constellation points (such as an I+jQ point in a modulation domain) or other coordinate point representations. The receiving device 210 may measure a transmitted symbol value 330 via a channel measurement 605 and may similarly map the channel measurement 605 to a constellation point (such as an I+jQ point in a modulation domain) or another coordinate point representation and may compare the two different candidate symbol values 505 to the channel measurement 605. In some implementations, the receiving device 210 may compare the two different candidate symbol values 505 to the channel measurement 605 by calculating or otherwise determining a distance between each of the candidate symbol values 505 and the channel measurement 605. For example, the receiving device 210 may calculate or otherwise determine a first distance between the candidate symbol value 505 obtained from the inputting of the candidate bit value 1 and the channel measurement 605 and may calculate or otherwise determine a second distance between the candidate symbol value 505 received or obtained from the inputting of the candidate bit value 0 and the channel measurement 605. The receiving device 210 may compare the first distance with the second distance to identify or otherwise determine which of the candidate bit value 1 or the candidate bit value 0 is more likely a bit value conveyed by a received signal associated with that coding stage or spine 320.

In some aspects, the receiving device 210 may identify or determine that the first distance associated with the candidate symbol value 505 obtained from the inputting of the candidate bit value 1 is smaller than the second distance associated with the candidate symbol value 505 obtained from the inputting of the candidate bit value 0. In some implementations, the receiving device 210 may elect to continue the decoding of the received signal assuming that the candidate bit value of 1 is a correct input for the hash function 315-b-1. Further, in some implementations, the receiving device 210 may elect to continue the decoding of the received signal assuming that both the candidate bit value of 1 and the candidate bit value of 0 may potentially be correct inputs for the hash function 315-b-1. For example, the receiving device 210 may continue the decoding down a sub-tree from each of the candidate symbol value 505 obtained from the inputting of the candidate bit value 1 and the candidate symbol value 505 obtained from the inputting of the candidate bit value 0 if both are within the B candidate symbol values 505 selected for a given decoding stage or spine 320 (such that both the first distance and the second distance satisfy, or are lower than, a threshold distance or such that the first distance and the second distance are among a quantity B of relatively shortest distances measured by the receiving device 210 for the given decoding stage or spine 320).

In scenarios in which the receiving device 210 continues the decoding down sub-trees from each of the candidate symbol value 505 obtained from the inputting of the candidate bit value 1 and the candidate symbol value 505 obtained from the inputting of the candidate bit value 0, the receiving device 210 may use the two different spines 320 obtained from the hash function 315-b-1 as inputs into a hash function 315-b-2 (a next hash function 315 of a rateless coding scheme). For example, the receiving device 210 may input a first spine 320 of $s_{1,1}$ (or s_1,1) and a second spine 320 of $s_{1,2}$ (or s_1,2), both of which may be candidate spines 320 for a next decoding stage or spine 320 of the decoder at the receiving device 210, into the hash function 315-b-2 along with candidate bit values for information that may be included or conveyed by a message segment 310 associated with that next decoding stage or spine 320.

As illustrated by the decoding scheme 600, the receiving device 210 may obtain two different candidate spines 320 in accordance with inputting, into the hash function 315-b-2, the candidate spine 320 $s_{1,1}$ and each of a candidate bit value 0 and a candidate bit value 1 and may obtain another two different candidate spines 320 in accordance with inputting, into the hash function 315-b-2, the candidate spine $s_{1,2}$ and each of a candidate bit value 0 and a candidate bit value 1. The receiving device 210 may obtain four different candidate symbol values 505 in accordance with inputting each of the (four) different candidate spines 320 into an RNG 325 and may map the four different candidate symbol values 505 to constellation points (such as an I+jQ point in a modulation domain) or other coordinate point representations. The receiving device 210 may measure an actually transmitted symbol value 330 associated with that decoding stage or spine 320 via a channel measurement 605 and may similarly map the channel measurement 605 to a constellation point (such as an I+jQ point in a modulation domain) or another coordinate point representation and may compare the four different candidate symbol values 505 to the channel measurement 605.

In some implementations, the receiving device 210 may compare the four different candidate symbol values 505 to the channel measurement 605 by calculating or otherwise determining a distance between each of the candidate symbol values 505 and the channel measurement 605. For example, the receiving device 210 may calculate or otherwise determine a first distance between the candidate symbol value 505 obtained from the inputting of the spine 320 $s_{1,1}$ and the candidate bit value 0 and the channel measurement 605, may calculate or otherwise determine a second distance between the candidate symbol value 505 obtained from the inputting of the spine 320 $s_{1,1}$ and the candidate bit value 1 and the channel measurement 605, and so on for each of a third distance and a fourth distance for the candidate symbol values 505 obtained from spine 320 $s_{1,2}$ and the candidate bit values 0 and 1, respectively. The receiving device 210 may compare the first distance, the second distance, the third distance, and the fourth distance to identify or otherwise determine which one or more of the candidate symbol values 505 are more likely actually transmitted symbol values 330 associated with that decoding stage or spine 320.

In some aspects, the receiving device 210 may identify or determine that the first distance associated with the candidate symbol value 505 obtained from the inputting of the candidate spine 320 $s_{1,1}$ and the candidate bit value 0 is smaller than the second distance, the third, distance, and the fourth distance. In some implementations, the receiving device 210 may elect to continue the decoding of the received signal assuming that the candidate spine 320 $s_{1,1}$ and the candidate bit value 0 are or may be correct inputs for the hash function 315-b-2. Further, in some implementations, the receiving device 210 may elect to continue the decoding of the received signal assuming that one or more other candidate spine values or candidate bit values are or may be correct inputs for the hash function 315-b-2. For example, the receiving device 210 may continue the decoding down a sub-tree from each candidate symbol value 505 that are within the B candidate symbol values 505 selected for a given decoding stage or spine 320.

Further, although described in the context of candidate bit values of a single bit (having a bit value of either 0 or 1), a receiving device 210 may similarly input other candidate bit values in scenarios in which message segments 310 include or convey other quantities of bits. For example, a receiving device 210 may input a candidate bit value 11, a candidate bit value 10, a candidate bit value 01, or a candidate bit value 00 into a hash function 315 in scenarios in which a message segment 310 (associated with a current decoding stage or spine 320 of the decoder) includes or conveys two bits (such that k=2). A receiving device 210 may similarly input any quantity of candidate bits corresponding to a quantity of bits that are included or conveyed by a message segment 310 (associated with a current decoding stage or spine 320 of the decoder) and, in some aspects, may support an upper limit of k (such as an upper limit of k=4). In some implementations, a receiving device 210 or a transmitting dive, or both, may signal such an upper limit of k to one or more other devices, such as the other of the receiving device 210 or the transmitting device 205.

In accordance with the calculation of the decoding metric using a Euclidean distance metric (either or both of which may be referred to as a spinal decoder metric), during a bubble decoder process, the decoding metric may become large on symbols that are unlikely to be an actually received symbol and the nodes with the lowest decoding metrics are the ones that survive the decoder process. Further, and as illustrated by and described in more detail with reference to FIG. 6, for each symbol there are $2^k$ other hypotheses that a receiving device 210 may make in order decode a correct symbol in each stage. Thus, in some implementations, a transmitting device 205 may focus on the hypotheses giving relatively low decoding metrics or path costs, as these are the hypotheses that may expand the decoding tree at the receiver side and potentially expand wrong codewords during the process.

For example, during encoding, an encoder of a transmitting device 205 may check the cost of a quantity of decoding hypothesis symbols (which may be equivalently referred to as decoding hypotheses or candidate symbol values 505), such as $2^k$ decoding hypothesis symbols, and may mark one or more symbol hypotheses with a path cost satisfying a threshold, such as path cost<threshold path cost, because those hypotheses are the ones that may be mostly likely to diverge a receiver from a correct codeword. The transmitting device may use the one or more marked symbols (which may correspond to or be associated with spines 320) for a next retransmission due to the relatively higher likelihood for the one or more marked symbols to be associated with a relatively higher error probability than other symbols.

In accordance with examples disclosed herein, characteristics of the decoding scheme 600 may be leveraged to improve various implementations of a search space, including identification of signals intended for a specific receiving device 210 or a specific set of receiving devices 210. For example, aspects of the decoding scheme 600 may be leveraged to support evaluations of a search space that enable an early termination of decoding operations on irrelevant signals, before such decoding is completed (such as rejecting a candidate before decoding is complete, rejecting a candidate without evaluating a decoded device identifier). Thus, although shown as having some viable candidate symbol values 505 (such as a candidate symbol value 505 relatively close, such as within a threshold distance, to a channel measurement 605), some scenarios may result in a lack of any viable candidate symbol values 505.

For example, if a receiving device 210 uses a different $s_0$ value for decoding than a transmitting device 205 used for encoding (as may occur if the transmitting device 205 and the receiving device 210 support a configuration of $s_0$ that is specific to a target receiving device 210, or a target set of receiving devices 210), the receiving device 210 may be unable to identify any candidate symbol values 505 within a threshold distance of a channel measurement 605. As such, the receiving device 210 may assume, infer, or otherwise determine that a received signal is not intended for the receiving device 210 and may refrain from performing any further calculations associated with a decoding of the received signal (in other words, may perform an early termination of the decoding of the received signal), such as refraining from comparing or otherwise evaluating further candidate symbol values 505 associated with a later spine 320 or coding index.

Figure 7:
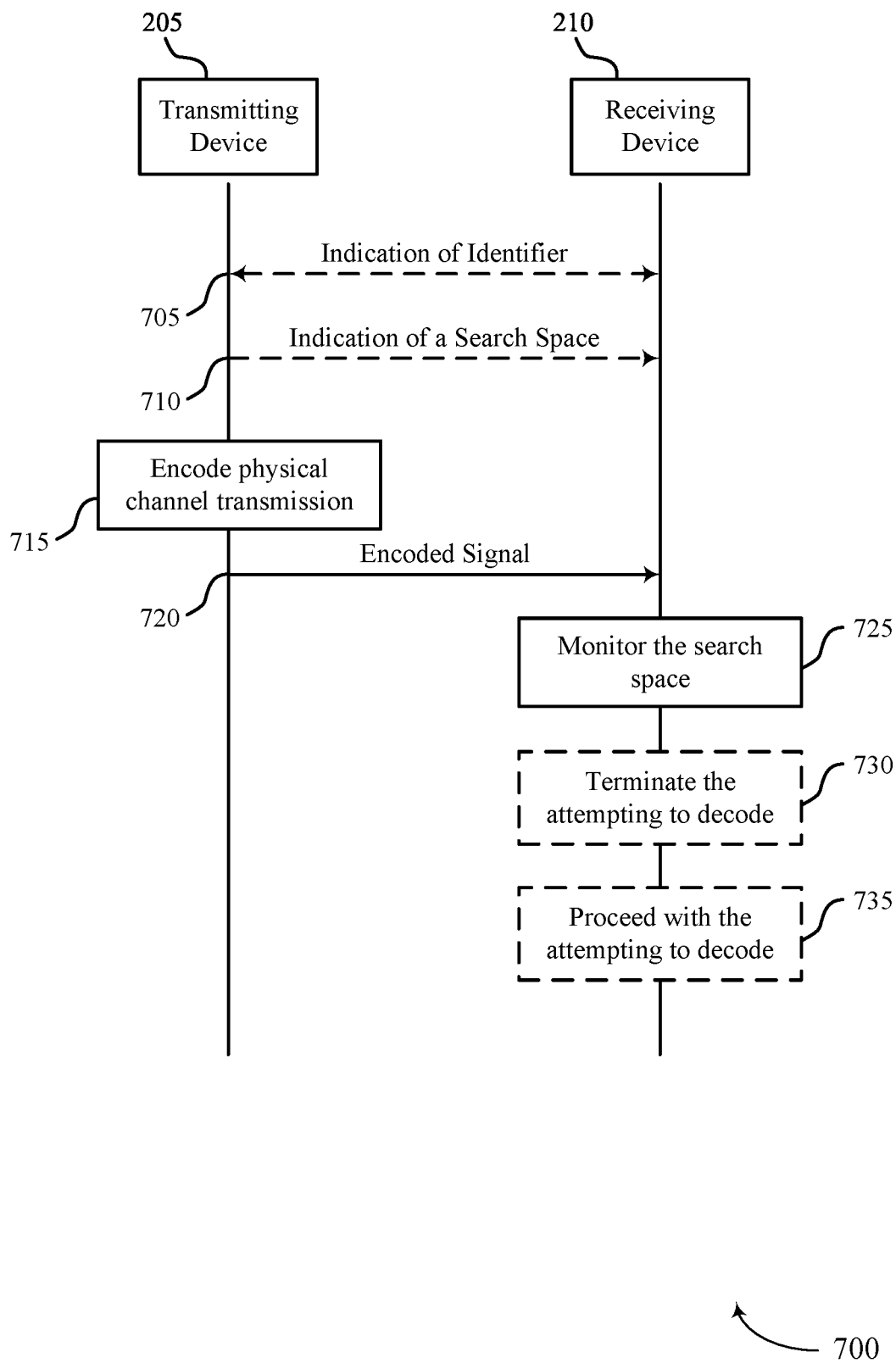
FIG. 7 shows an example process flow that supports early termination of blind decoding with rateless coding.

FIG. 7 shows an example process flow 700 that supports early termination of blind decoding with rateless coding. The process flow 700 may implement or be implemented to realize aspects of the wireless communications system 100 or the signaling diagram 200. For example, the process flow 700 illustrates communication between a transmitting device 205 and a receiving device 210. The transmitting device 205 may be an example of or otherwise function as one or more components of a BS 105 as illustrated by and described with reference to FIG. 1. The receiving device 210 may be an example of or otherwise function as a UE 115 as illustrated by and described with reference to FIG. 1. In some implementations, the transmitting device 205 may encode a control signal using a rateless code, such as a spinal code, and the transmitting device 205 and the receiving device 210 may support an encoding and a decoding of the control signal in accordance with an initial state, a seed value, or some other parameter associated with the rateless code that is configured to have a value associated with an intended receiving device 210.

In the following description of the process flow 700, the operations may be performed (such as reported or provided) in a different order than the order shown, or the operations performed by the example devices may be performed in different orders or at different times. Some operations also may be omitted from the process flow 700, or other operations may be added to the process flow 700. Further, although some operations or signaling may be shown to occur at different times for discussion purposes, these operations may actually occur at the same time or otherwise concurrently.

In some implementations, at 705, the transmitting device 205 may transmit or receive an indication of an identifier associated with the receiving device 210 to or from the receiving device 210. For example, the indication of the identifier associated with the receiving device 210 may be shared or otherwise mutually understood between the transmitting device 205 and the receiving device 210 from signaling either from the transmitting device 205 or from the receiving device 210, or via a transmission of signals from both. The identifier associated with the receiving device 210 may be an example of any value or parameter that is able to identify (such as uniquely identify) the receiving device 210 or a group of receiving devices 210 including the receiving device 210. In other words, the identifier may be device-specific or group-specific. In some aspects, for example, the identifier associated with the receiving device 210 may be an RNTI of the receiving device 210. Additionally, or alternatively, the identifier may be associated with the transmitting device 205 and the receiving device 210 may use the identifier for early termination of decoding in accordance with expecting a transmission from a specific transmitting device 205.

In some implementations, at 710, the transmitting device 205 may transmit, to the receiving device 210, an indication of a search space associated with a set of one or more physical channel candidates, such as PDCCH candidates, which may be encoded with a rateless coding, such as a spinal coding, a rateless modulation and coding scheme, or other scheme that includes a joint encoding and modulation. In some implementations, the indication of 605 may indicate resources in the time domain, in the frequency domain, or in the spatial domain, or any combination thereof, that may convey signals intended for the receiving device 210, and that may be associated with a blind decoding or other evaluation by the receiving device 210 to identify a presence of such signals.

At 715, the transmitting device 205 may encode a physical channel transmission (such as a signal conveyed by the physical channel transmission) in accordance with the rateless coding using the identifier associated with the UE as an input. For example, for some rateless coding schemes (including a spinal coding scheme), the transmitting device 205 may use the identifier associated with the receiving device 210 as an $s_0$ value. For example, the transmitting device 205 may obtain, as an output of one or more hash functions, an encoded value in accordance with inputting, into the one or more hash functions, the identifier associated with the receiving device 210 and a set of bit values associated with the physical channel transmission. The transmitting device 205 may obtain, as an output of a numeric transposition function (such as an RNG 325), a symbol value in accordance with inputting, into the numeric transposition function, the encoded value and may map the symbol value to resources of the search space (such as to a physical channel candidate of the set of one or more physical channel candidates, which may include a mapping to a modulation symbol or a constellation point in accordance with a resource configuration of the search space).

At 720, the transmitting device 205 may transmit the encoded signal via the physical channel transmission (such as a PDCCH transmission) using the resources of the search space. For example, the transmitting device 205 may transmit the encoded signal via the physical channel transmission over at least one physical channel candidate of the set of one or more physical channel candidates. In some implementations, the transmitting device 205 may encode other signals for other physical channel transmissions, which may or may not include using different identifiers associated with one or more other intended receiving devices 210 or intended sets of receiving devices 210.

At 725, the receiving device 210 may monitor the search space associated with the set of one or more physical channel candidates. For example, the receiving device 210 may monitor over one or more (such as each) physical channel candidate of the set of one or more physical channel candidates associated with the search space, where each physical channel candidate may correspond to a resource in the time domain, in the frequency domain, in the spatial domain, or a combination thereof. The receiving device 210 may monitor the search space (and likewise the set of one or more physical channel candidates) for a signal, such as a control signal or DCI, from the transmitting device 205.

In some aspects, monitoring the search space may include attempting to decode a physical channel candidate (such as a PDCCH candidate) of the set of one or more physical channel candidates in accordance with the rateless coding using the identifier associated with the receiving device 210 as an input value (such as an $s_0$ value) of the attempted decoding. For example, for some rateless coding schemes (including a spinal coding scheme), the receiving device 210 may use the identifier associated with the receiving device 210 as an $s_0$ value and evaluate how use of the identifier as the $s_0$ value impacts a decoding metric associated with the attempted decoding.

In some implementations, the receiving device 210 may receive, calculate, or otherwise obtain a set of candidate encoded values (such as a set of candidate spines 320) as an output of a set of one or more hash functions in accordance with inputting, into the one or more hash functions, the identifier associated with the receiving device 210 (or an encoded value that reflects information pertaining to the identifier associated with the receiving device 210) and a set of candidate bit values for the physical channel candidate. The receiving device 210 may further receive, calculate, or otherwise obtain, as an output of a numeric transposition function (such as an RNG 325), a set of candidate symbol values (such as a set of candidate symbol values 505) in accordance with inputting, into the numeric transposition function, each of the set of candidate encoded values. The receiving device 210 may compare a measurement of the encoded signal associated with the physical channel candidate with each candidate symbol value and may calculate or determine, as a result of the comparison, a respective Euclidean distance between the measurement of the signal and each candidate symbol value.

In some aspects, the receiving device 210 may attempt to decode or otherwise evaluate the signal (such as evaluate whether the signal is receiving device 210 is an intended receiver of the signal) using a subset of possible encoded values associated with a coding index of the signal. For example, if a coding index (such as a spine 320) corresponding to the signal of 720 is a second coding index, such that the signal reflects information associated with a spine $s_2$, and if $th_1$ is equal to or indicates a spine $s_1$, the receiving device 210 may calculate a decoding metric or a path cost associated with one candidate symbol value 505 at the spine $s_2$ for each potential spine value at the spine $s_1$. In other words, for example, the receiving device 210 may calculate $2^k$ different candidate spine values $s_1$ (as a result of trying different sets of k candidate bits, such that the $2^k$ different candidate spine values $s_1$ may include $s_{1,1}$ and $s_{1,2}$ if k=1) and may calculate a decoding metric or a path cost for one candidate symbol value 505 for spine $s_2$ for each of the $2^k$ different candidate spine values $s_1$.

In implementations in which k=1, for example, the receiving device 210 may calculate four different candidate encoded values at for spine $s_2$, including a spine $s_{2,1}$ and $s_{2,2}$ that branch from $s_{1,1}$ and a spine $s_{2,3}$ and $s_{2,4}$ that branch from $s_{1,2}$ and may elect to calculate a decoding metric or path cost for one of $s_{2,1}$ or $s_{2,2}$ and for one of $s_{2,3}$ and $s_{2,4}$. Thus, if a decoding metric or path for at least one of the selected one of $s_{2,1}$ or $s_{2,2}$ or the selected one of $s_{2,3}$ and $s_{2,4}$ satisfy a threshold decoding metric $th_2$, the receiving device 210 may assume or infer that the signal is intended for the receiving device 210 (such as may infer that the transmitting device used a same $s_0$ to encode the signal as the receiving device 210 uses to decode the signal. Alternatively, if a decoding metric or path for neither of the selected one of $s_{2,1}$ or $s_{2,2}$ or the selected one of $s_{2,3}$ and $s_{2,4}$ satisfy a threshold decoding metric $th_e$, the receiving device 210 may assume or infer that the signal is not intended for the receiving device 210 (such as may infer that the transmitting device used a different $s_0$ to encode the signal than the receiving device 210 uses to decode the signal).

Such an analysis of a decoding metric using a subset of possible candidate encoded values for a received coding index, each of which trace back to a different possible encoded value at the coding index corresponding to $th_1$, may be understood as effectively analyzing the decoding metric at the coding index corresponding to $th_1$ because differences in the calculated decoding metrics for each of the subset of possible candidate encoded values may primarily reflect deviations from a correct encoded value at the coding index corresponding to $th_1$. Further, such an analysis of a decoding metric using a subset of possible candidate encoded values for a received coding index, each of which trace back to a different possible encoded value at the coding index corresponding to $th_1$, may be understood as a partial decoding as the receiving device 210 refrains from calculating all possible candidate encoded values for the received coding index.

Accordingly, at 730 and in scenarios in which none of the set of candidate symbol values (corresponding to the subset of possible candidate encoded values) is associated with a decoding metric that satisfies the decoding metric threshold, the receiving device 210 may terminate the decoding attempt for the physical channel candidate. For example, the receiving device 210 may infer that none of the set of candidate encoded values associated with the identifier of the receiving device 210 are correct, as may occur if the encoded signal is not intended for the receiving device 210.

Alternatively, at 735 and in scenarios in which at least one of the set of candidate symbol values (corresponding to the subset of possible candidate encoded values) is associated with a decoding metric that satisfies a decoding metric threshold, the receiving device 210 may proceed with the decoding attempt for the physical channel candidate. For example, the receiving device 210 may infer that at least one of the set of candidate encoded values associated with the identifier of the receiving device 210 is correct, as may occur if the encoded signal is intended for the receiving device 210.

Figure 8:
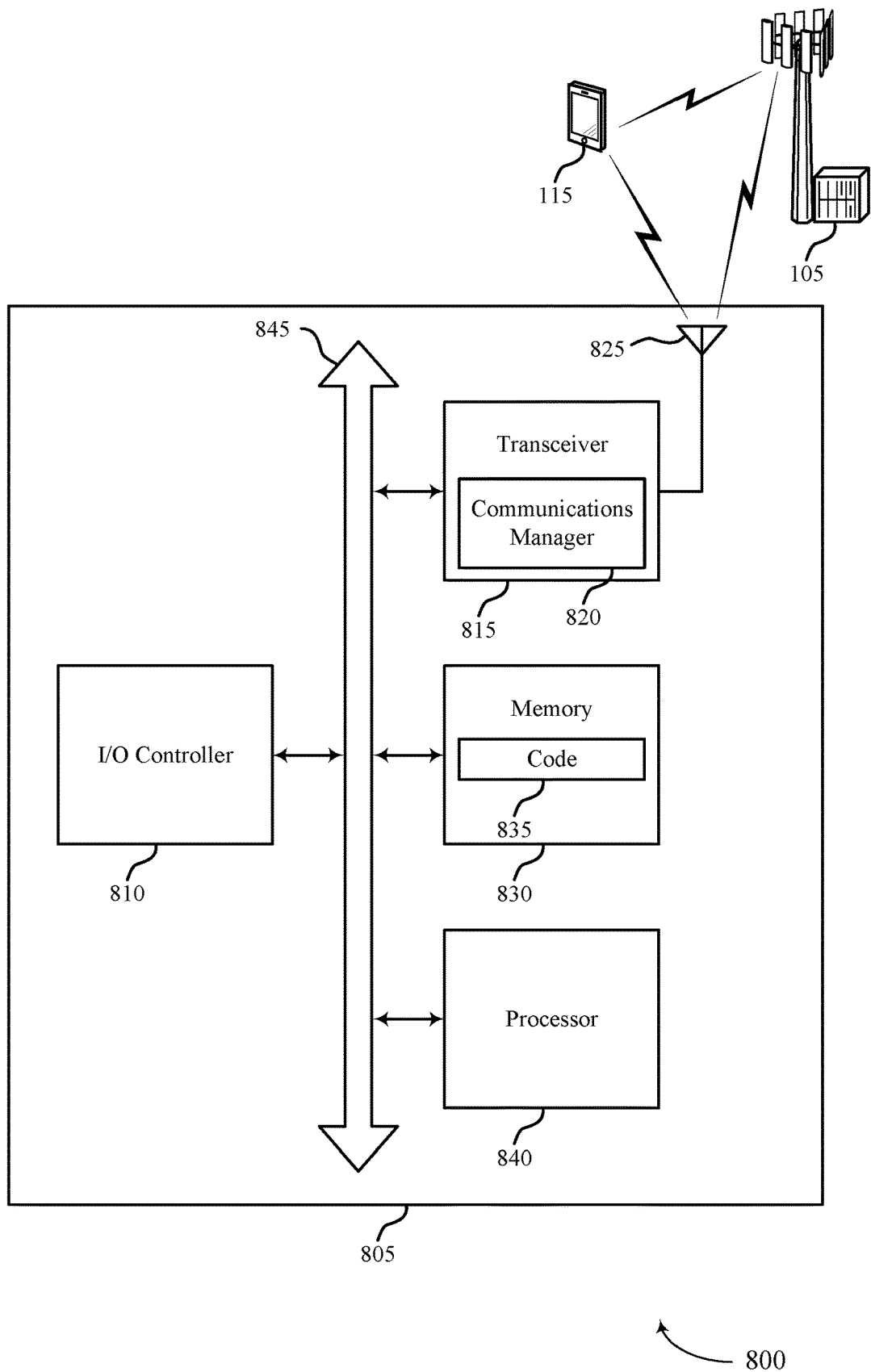
FIGS. 8 and 9 show block diagrams of example devices that support early termination of blind decoding with rateless coding.

FIG. 8 shows a block diagram 800 of an example device 805 that supports early termination of blind decoding with rateless coding. The device 805 may communicate wirelessly with one or more BSs 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (such as operatively, communicatively, functionally, electronically, electrically) via one or more buses (such as a bus 845).

The I/O controller 810 may manage input and output signals for the device 805. The I/O controller 810 also may manage peripherals not integrated into the device 805. In some implementations, the I/O controller 810 may represent a physical connection or port to an external peripheral. In some implementations, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some implementations, the I/O controller 810 may be implemented as part of a processor or processing system, such as the processor 840. In some implementations, a user may interact with the device 805 via the I/O controller 810 or via hardware components controlled by the I/O controller 810.

In some implementations, the device 805 may include a single antenna 825. However, in some other implementations, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 also may include a modem to modulate the packets, to provide the modulated packets to one or more antennas 825 for transmission, and to demodulate packets received from the one or more antennas 825.

In some implementations, the transceiver 815 may include one or more interfaces, such as one or more interfaces coupled with the one or more antennas 825 that are configured to support various receiving or obtaining operations, or one or more interfaces coupled with the one or more antennas 825 that are configured to support various transmitting or outputting operations, or a combination thereof. In some implementations, the transceiver 815 may include or be configured for coupling with one or more processors or memory components that are operable to perform or support operations associated with received or obtained information or signals, or to generate information or other signals for transmission or other outputting, or any combination thereof. In some implementations, the transceiver 815, or the transceiver 815 and the one or more antennas 825, or the transceiver 815 and the one or more antennas 825 and one or more processors or memory components (such as the processor 840, or the memory 830, or both), may be included in a chip or chip assembly that is installed in the device 805.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some implementations, the code 835 may not be directly executable by the processor 840 but may cause a computer (such as when compiled and executed) to perform functions described herein. In some implementations, the memory 830 may contain, among other things, a basic I/O system (BIOS) which may control basic hardware or software operation such as the interaction with peripheral components or devices.

The processor 840 may be any one or more suitable processors capable of executing scripts or instructions of one or more software programs stored in the device 805 (such as within the memory 830). In some implementations, the processor 840 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 840, or the transceiver 815, or the communications manager 820, or other components or combinations of components of the device 805.

The processing system of the device 805 may interface with other components of the device 805, and may process information received from other components (such as inputs or signals) or output information to other components. For example, a chip or modem of the device 805 may include a processing system, a first interface to output information, and a second interface to obtain information. In some implementations, the first interface may refer to an interface between the processing system of the chip or modem and a transmitter, such that the device 805 may transmit information output from the chip or modem. In some implementations, the second interface may refer to an interface between the processing system of the chip or modem and a receiver, such that the device 805 may obtain information or signal inputs, and the information may be passed to the processing system. A person having ordinary skill in the art will readily recognize that the first interface also may obtain information or signal inputs, and the second interface also may output information or signal outputs.

The communications manager 820 may support wireless communication at a UE in accordance with examples as disclosed herein. For example, the communications manager 820 may be configured as or otherwise support a means for receiving, at the UE, an indication of an identifier associated with the UE. The communications manager 820 may be configured as or otherwise support a means for receiving, at the UE, an indication of a search space associated with a set of one or more physical channel candidates encoded with a rateless coding. The communications manager 820 may be configured as or otherwise support a means for monitoring the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding.

In some implementations, to support attempting to decode the physical channel candidate, the communications manager 820 may be configured as or otherwise support a means for receiving, as an output of a set of one or more hash functions of the rateless coding, a set of candidate encoded values in accordance with inputting, into the set of one or more hash functions, the identifier associated with the UE and a set of candidate bit values for the physical channel candidate. In some implementations, to support attempting to decode the physical channel candidate, the communications manager 820 may be configured as or otherwise support a means for receiving, as an output of a numeric transposition function of the rateless coding, a set of candidate symbol values in accordance with inputting, into the numeric transposition function, each of the set of candidate encoded values. In some implementations, to support attempting to decode the physical channel candidate, the communications manager 820 may be configured as or otherwise support a means for comparing a measurement of a signal associated with the physical channel candidate with each candidate symbol value of the set of candidate symbol values.

In some implementations, to support comparing the measurement of the signal associated with the physical channel candidate with each candidate symbol value of the set of candidate symbol values, the communications manager 820 may be configured as or otherwise support a means for determining, for each candidate symbol value of the set of candidate symbol values, a respective Euclidian distance between the measurement of the signal associated with the physical channel candidate and the candidate symbol value.

In some implementations, the rateless coding is associated with a set of multiple coding indices, each coding index of the set of multiple coding indices corresponding to a cumulative encoding of a respective quantity of message segments. In some implementations, the set of candidate encoded values is a subset of a set of possible encoded values associated with a coding index corresponding to the signal associated with the physical channel candidate.

In some implementations, the set of candidate encoded values includes a single encoded value of the set of possible encoded values for each possible encoded value of a second set of possible encoded values associated with a second coding index that is different than the coding index corresponding to the signal associated with the physical channel candidate.

In some implementations, the communications manager 820 may be configured as or otherwise support a means for terminating the attempting to decode the physical channel candidate as a result of each of the comparisons, of the measurement of the signal associated with the physical channel candidate with each candidate symbol value of the set of candidate symbol values, failing to satisfy a decoding metric threshold.

In some implementations, the communications manager 820 may be configured as or otherwise support a means for proceeding with the decoding of the physical channel candidate as a result of each of the comparisons, of the measurement of the signal associated with the physical channel candidate with each candidate symbol value of the set of candidate symbol values, satisfying a decoding metric threshold.

In some implementations, the identifier associated with the UE includes an RNTI associated with the UE. In some implementations, the set of one or more physical channel candidates includes a set of one or more PDCCH candidates.

In some implementations, the communications manager 820 may be configured to perform various operations (such as receiving, monitoring, transmitting) using or otherwise in cooperation with the transceiver 815, the one or more antennas 825, or any combination thereof. Although the communications manager 820 is illustrated as a separate component, in some implementations, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of early termination of blind decoding with rateless coding as described herein, or the processor 840 and the memory 830 may be otherwise configured to perform or support such operations.

Figure 9:
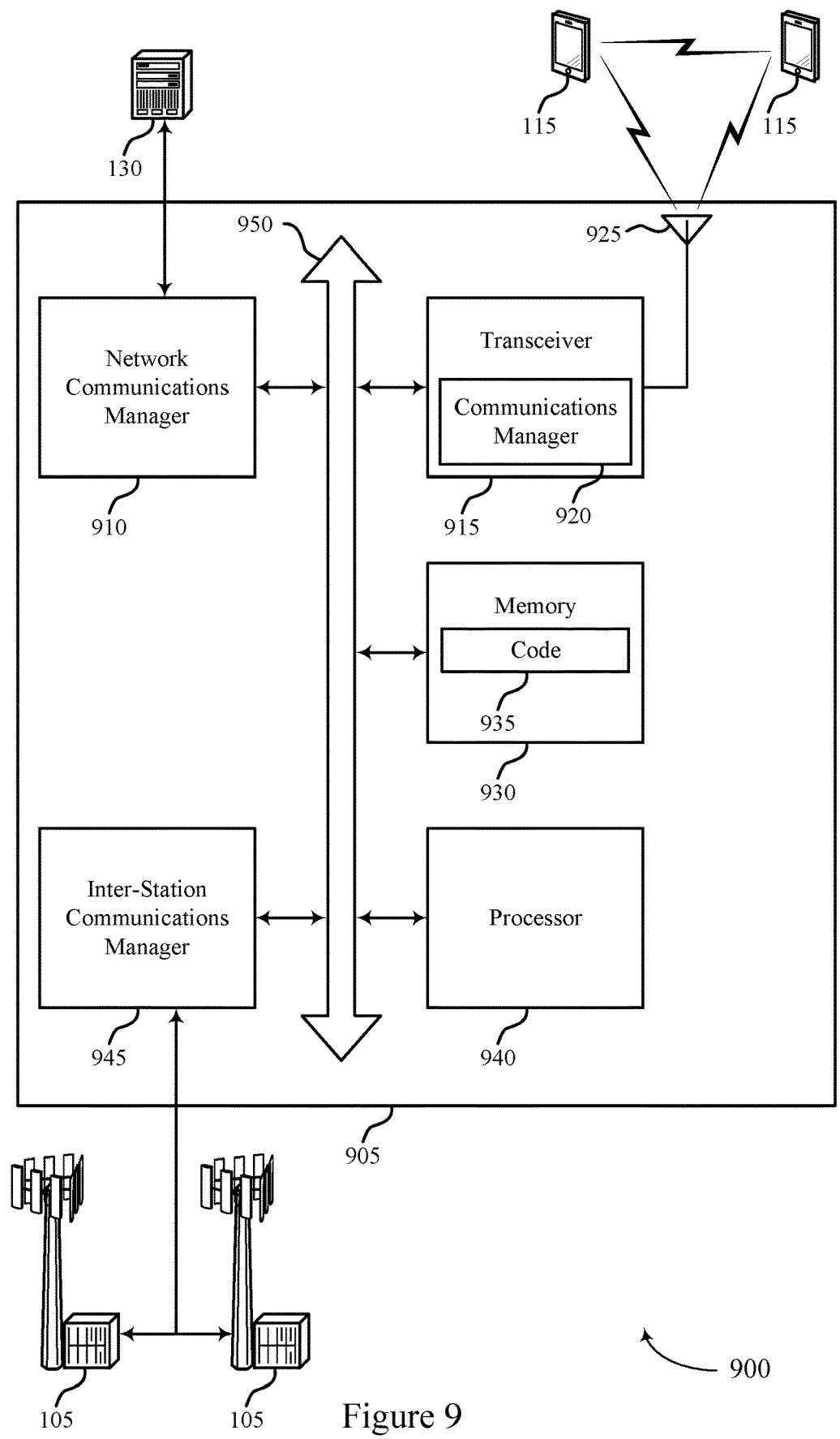

FIG. 9 shows a block diagram 900 of an example device 905 that supports early termination of blind decoding with rateless coding. The device 905 may communicate wirelessly with one or more BSs 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (such as operatively, communicatively, functionally, electronically, electrically) via one or more buses (such as a bus 950).

The network communications manager 910 may manage communications with a core network 130 (such as via one or more wired backhaul links). For example, the network communications manager 910 may manage the transfer of data communications for client devices, such as one or more UEs 115.

In some implementations, the device 905 may include a single antenna 925. However, in some other implementations, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 also may include a modem to modulate the packets, to provide the modulated packets to one or more antennas 925 for transmission, and to demodulate packets received from the one or more antennas 925.

In some implementations, the transceiver 915 may include one or more interfaces, such as one or more interfaces coupled with the one or more antennas 925 that are configured to support various receiving or obtaining operations, or one or more interfaces coupled with the one or more antennas 925 that are configured to support various transmitting or outputting operations, or a combination thereof. In some implementations, the transceiver 915 may include or be configured for coupling with one or more processors or memory components that are operable to perform or support operations associated with received or obtained information or signals, or to generate information or other signals for transmission or other outputting, or any combination thereof. In some implementations, the transceiver 915, or the transceiver 915 and the one or more antennas 925, or the transceiver 915 and the one or more antennas 925 and one or more processors or memory components (such as the processor 940, or the memory 930, or both), may be included in a chip or chip assembly that is installed in the device 905.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some implementations, the code 935 may not be directly executable by the processor 940 but may cause a computer (such as when compiled and executed) to perform functions described herein. In some implementations, the memory 930 may contain, among other things, a BIOS which may control basic hardware or software operation such as the interaction with peripheral components or devices.

The processor 940 may be any one or more suitable processors capable of executing scripts or instructions of one or more software programs stored in the device 905 (such as within the memory 930). In some implementations, the processor 940 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 940, or the transceiver 915, or the communications manager 920, or other components or combinations of components of the device 905.

The processing system of the device 905 may interface with other components of the device 905, and may process information received from other components (such as inputs or signals) or output information to other components. For example, a chip or modem of the device 905 may include a processing system, a first interface to output information, and a second interface to obtain information. In some implementations, the first interface may refer to an interface between the processing system of the chip or modem and a transmitter, such that the device 905 may transmit information output from the chip or modem. In some implementations, the second interface may refer to an interface between the processing system of the chip or modem and a receiver, such that the device 905 may obtain information or signal inputs, and the information may be passed to the processing system. A person having ordinary skill in the art will readily recognize that the first interface also may obtain information or signal inputs, and the second interface also may output information or signal outputs.

The inter-station communications manager 945 may manage communications with other BSs 105, and may include a controller or scheduler for controlling communications with UEs 115 in cooperation with other BSs 105. For example, the inter-station communications manager 945 may coordinate scheduling for transmissions to UEs 115 for various interference mitigation techniques such as beamforming or joint transmission. In some implementations, the inter-station communications manager 945 may provide an X2 interface within an LTE/LTE-A wireless communications network technology to provide communication between BSs 105.

The communications manager 920 may support wireless communication at a network entity in accordance with examples as disclosed herein. For example, the communications manager 920 may be configured as or otherwise support a means for transmitting, to a UE, an indication of an identifier associated with the UE. The communications manager 920 may be configured as or otherwise support a means for transmitting, to the UE, an indication of a search space associated with a set of one or more physical channels encoded with a rateless coding. The communications manager 920 may be configured as or otherwise support a means for transmitting, to the UE, a physical channel transmission using resources of the search space, where the physical channel transmission is encoded in accordance with the rateless coding using the identifier associated with the UE as an input value of the encoding.

In some implementations, the communications manager 920 may be configured as or otherwise support a means for encoding the physical channel transmission, where the encoding includes. In some implementations, the communications manager 920 may be configured as or otherwise support a means for receiving, as an output of a set of one or more hash functions, an encoded value in accordance with inputting, into the set of one or more hash functions, the identifier associated with the UE and a set of bit values associated with the physical channel transmission. In some implementations, the communications manager 920 may be configured as or otherwise support a means for receiving, as an output of a numeric transposition function, a symbol value in accordance with inputting, into the numeric transposition function, the encoded value. In some implementations, the communications manager 920 may be configured as or otherwise support a means for mapping the symbol value to the resources of the search space for transmission.

In some implementations, the rateless coding is associated with a set of multiple coding indices, each coding index of the set of multiple coding indices corresponding to a cumulative encoding of a respective quantity of message segments.

In some implementations, the communications manager 920 may be configured as or otherwise support a means for transmitting, to a second UE, a second physical channel transmission using second resources of the search space, where the second physical channel transmission is encoded in accordance with the rateless coding using a second identifier associated with the second UE, different than the identifier associated with the UE, as an input.

In some implementations, the identifier associated with the UE includes an RNTI. In some implementations, the set of one or more physical channels includes a set of one or more PDCCH candidates.

In some implementations, the communications manager 920 may be configured to perform various operations (such as receiving, monitoring, transmitting) using or otherwise in cooperation with the transceiver 915, the one or more antennas 925, or any combination thereof. Although the communications manager 920 is illustrated as a separate component, in some implementations, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of early termination of blind decoding with rateless coding as described herein, or the processor 940 and the memory 930 may be otherwise configured to perform or support such operations.

Figure 10:
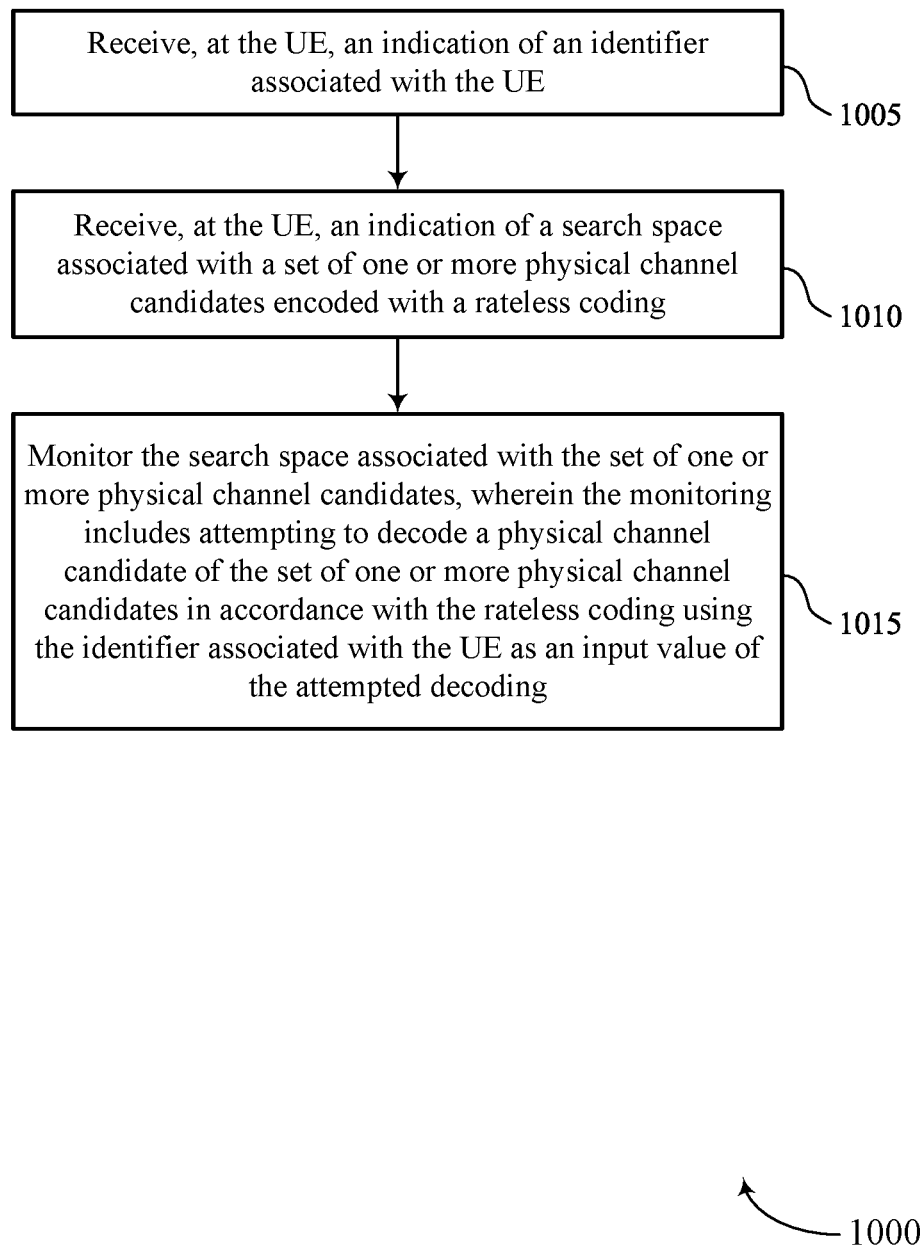
FIGS. 10 and 11 show flowcharts illustrating example methods that support early termination of blind decoding with rateless coding.

FIG. 10 shows a flowchart illustrating an example method 1000 that supports early termination of blind decoding with rateless coding. The operations of the method 1000 may be implemented by a UE or its components as described herein. For example, the operations of the method 1000 may be performed by a UE 115 as described with reference to FIGS. 1-8. In some implementations, a UE may execute a set of instructions to control the functional elements of the UE to perform the described functions. Additionally, or alternatively, the UE may perform aspects of the described functions using special-purpose hardware.

At 1005, the method may include receiving, at the UE, an indication of an identifier associated with the UE. The operations of 1005 may be performed in accordance with examples as disclosed herein.

At 1010, the method may include receiving, at the UE, an indication of a search space associated with a set of one or more physical channel candidates encoded with a rateless coding. The operations of 1010 may be performed in accordance with examples as disclosed herein.

At 1015, the method may include monitoring the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding. The operations of 1015 may be performed in accordance with examples as disclosed herein.

Figure 11:
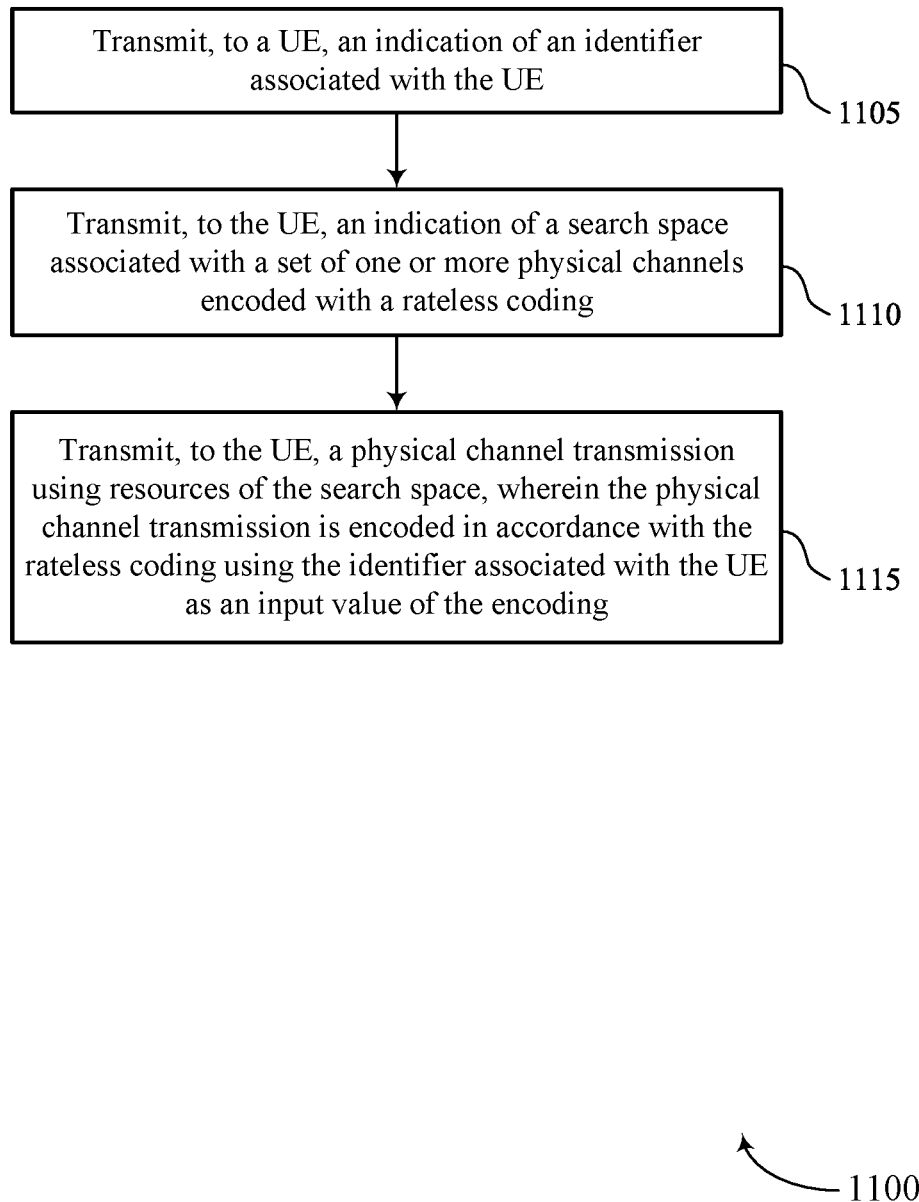

FIG. 11 shows a flowchart illustrating an example method 1100 that supports early termination of blind decoding with rateless coding. The operations of the method 1100 may be implemented by a BS or its components as described herein. For example, the operations of the method 1100 may be performed by a BS 105 as described with reference to FIGS. 1-7 and 9. In some implementations, a BS may execute a set of instructions to control the functional elements of the BS to perform the described functions. Additionally, or alternatively, the BS may perform aspects of the described functions using special-purpose hardware.

At 1105, the method may include transmitting, to a UE, an indication of an identifier associated with the UE. The operations of 1105 may be performed in accordance with examples as disclosed herein.

At 1110, the method may include transmitting, to the UE, an indication of a search space associated with a set of one or more physical channels encoded with a rateless coding. The operations of 1110 may be performed in accordance with examples as disclosed herein.

At 1115, the method may include transmitting, to the UE, a physical channel transmission using resources of the search space, where the physical channel transmission is encoded in accordance with the rateless coding using the identifier associated with the UE as an input value of the encoding. The operations of 1115 may be performed in accordance with examples as disclosed herein.

The following provides an overview of some aspects of the present disclosure:

Aspect 1: A method for wireless communication at a UE, including: receiving, at the UE, an indication of an identifier associated with the UE; receiving, at the UE, an indication of a search space associated with a set of one or more physical channel candidates encoded with a rateless coding; and monitoring the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding.

Aspect 2: The method of aspect 1, where attempting to decode the physical channel candidate includes: receiving, as an output of a set of one or more hash functions of the rateless coding, a set of candidate encoded values in accordance with inputting, into the set of one or more hash functions, the identifier associated with the UE and a set of candidate bit values for the physical channel candidate; receiving, as an output of a numeric transposition function of the rateless coding, a set of candidate symbol values in accordance with inputting, into the numeric transposition function, each of the set of candidate encoded values; and comparing a measurement of a signal associated with the physical channel candidate with each candidate symbol value of the set of candidate symbol values.

Aspect 3: The method of aspect 2, where comparing the measurement of the signal associated with the physical channel candidate with each candidate symbol value of the set of candidate symbol values includes: determining, for each candidate symbol value of the set of candidate symbol values, a respective Euclidian distance between the measurement of the signal associated with the physical channel candidate and the candidate symbol value.

Aspect 4: The method of any of aspects 2 or 3, where the rateless coding is associated with a set of multiple coding indices, each coding index of the set of multiple coding indices corresponding to a cumulative encoding of a respective quantity of message segments; and the set of candidate encoded values is a subset of a set of possible encoded values associated with a coding index corresponding to the signal associated with the physical channel candidate.

Aspect 5: The method of aspect 4, where the set of candidate encoded values includes a single encoded value of the set of possible encoded values for each possible encoded value of a second set of possible encoded values associated with a second coding index that is different than the coding index corresponding to the signal associated with the physical channel candidate.

Aspect 6: The method of any of aspects 2-5, further including: terminating the attempting to decode the physical channel candidate as a result of each of the comparisons, of the measurement of the signal associated with the physical channel candidate with each candidate symbol value of the set of candidate symbol values, failing to satisfy a decoding metric threshold.

Aspect 7: The method of any of aspects 2-5, further including: proceeding with the decoding of the physical channel candidate as a result of each of the comparisons, of the measurement of the signal associated with the physical channel candidate with each candidate symbol value of the set of candidate symbol values, satisfying a decoding metric threshold.

Aspect 8: The method of any of aspects 1-7, where the identifier associated with the UE includes an RNTI associated with the UE.

Aspect 9: The method of any of aspects 1-8, where the set of one or more physical channel candidates includes a set of one or more PDCCH candidates.

Aspect 10: A method for wireless communication at a network entity, including: transmitting, to a UE, an indication of an identifier associated with the UE; transmitting, to the UE, an indication of a search space associated with a set of one or more physical channels encoded with a rateless coding; and transmitting, to the UE, a physical channel transmission using resources of the search space, where the physical channel transmission is encoded in accordance with the rateless coding using the identifier associated with the UE as an input value of the encoding.

Aspect 11: The method of aspect 10, further including: encoding the physical channel transmission, where the encoding includes: receiving, as an output of a set of one or more hash functions, an encoded value in accordance with inputting, into the set of one or more hash functions, the identifier associated with the UE and a set of bit values associated with the physical channel transmission; receiving, as an output of a numeric transposition function, a symbol value in accordance with inputting, into the numeric transposition function, the encoded value; and mapping the symbol value to the resources of the search space for transmission.

Aspect 12: The method of any of aspects 10 or 11, where the rateless coding is associated with a set of multiple coding indices, each coding index of the set of multiple coding indices corresponding to a cumulative encoding of a respective quantity of message segments.

Aspect 13: The method of any of aspects 10-12, further including: transmitting, to a second UE, a second physical channel transmission using second resources of the search space, where the second physical channel transmission is encoded in accordance with the rateless coding using a second identifier associated with the second UE, different than the identifier associated with the UE, as an input.

Aspect 14: The method of any of aspects 10-13, where the identifier associated with the UE includes an RNTI.

Aspect 15: The method of any of aspects 10-14, where the set of one or more physical channels includes a set of one or more PDCCH candidates.

Aspect 16: An apparatus for wireless communication at a UE, including: a first interface configured to: obtain, at the UE, an indication of an identifier associated with the UE; obtain, at the UE, an indication of a search space associated with a set of one or more physical channel candidates encoded with a rateless coding; and the first interface, a second interface, or a processing system configured to: monitor the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding.

Aspect 17: The apparatus of aspect 16, where, to attempt to decode the physical channel candidate, the processing system may be further configured to: obtain, as an output of a set of one or more hash functions of the rateless coding, a set of candidate encoded values in accordance with inputting, into the set of one or more hash functions, the identifier associated with the UE and a set of candidate bit values for the physical channel candidate; obtain, as an output of a numeric transposition function of the rateless coding, a set of candidate symbol values in accordance with inputting, into the numeric transposition function, each of the set of candidate encoded values; and compare a measurement of a signal associated with the physical channel candidate with each candidate symbol value of the set of candidate symbol values.

Aspect 18: The apparatus of aspect 17, where, to compare the measurement of the signal associated with the physical channel candidate with each candidate symbol value of the set of candidate symbol values, the processing system may be further configured to: determine, for each candidate symbol value of the set of candidate symbol values, a respective Euclidian distance between the measurement of the signal associated with the physical channel candidate and the candidate symbol value.

Aspect 19: The apparatus of any of aspects 17-18, where: the rateless coding is associated with a set of multiple coding indices, each coding index of the set of multiple coding indices corresponding to a cumulative encoding of a respective quantity of message segments; and the set of candidate encoded values is a subset of a set of possible encoded values associated with a coding index corresponding to the signal associated with the physical channel candidate.

Aspect 20: The apparatus of aspect 19, where the set of candidate encoded values includes a single encoded value of the set of possible encoded values for each possible encoded value of a second set of possible encoded values associated with a second coding index that is different than the coding index corresponding to the signal associated with the physical channel candidate.

Aspect 21: The apparatus of any of aspects 17-20, where the processing system is further configured to: terminate the attempting to decode the physical channel candidate as a result of each of the comparisons, of the measurement of the signal associated with the physical channel candidate with each candidate symbol value of the set of candidate symbol values, failing to satisfy a decoding metric threshold.

Aspect 22: The apparatus of any of aspects 17-20, where the processing system is further configured to: proceed with the decoding of the physical channel candidate as a result of each of the comparisons, of the measurement of the signal associated with the physical channel candidate with each candidate symbol value of the set of candidate symbol values, satisfying a decoding metric threshold.

Aspect 23: The apparatus of any of aspects 16-22, where the identifier associated with the UE includes an RNTI associated with the UE.

Aspect 24: The apparatus of any of aspects 16-23, where the set of one or more physical channel candidates includes a set of one or more PDCCH candidates.

Aspect 25: An apparatus for wireless communication at a network entity, including: a first interface configured to: output, to a UE, an indication of an identifier associated with the UE; output, to the UE, an indication of a search space associated with a set of one or more physical channels encoded with a rateless coding; and output, to the UE, a physical channel transmission using resources of the search space, where the physical channel transmission is encoded in accordance with the rateless coding using the identifier associated with the UE as an input value of the encoding.

Aspect 26: The apparatus of aspect 25, further including: a processing system configured to: encode the physical channel transmission, where the encoding includes: obtain, as an output of a set of one or more hash functions, an encoded value in accordance with inputting, into the set of one or more hash functions, the identifier associated with the UE and a set of bit values associated with the physical channel transmission; obtain, as an output of a numeric transposition function, a symbol value in accordance with inputting, into the numeric transposition function, the encoded value; and map the symbol value to the resources of the search space for transmission.

Aspect 27: The apparatus of any of aspects 25 or 26, where the rateless coding is associated with a set of multiple coding indices, each coding index of the set of multiple coding indices corresponding to a cumulative encoding of a respective quantity of message segments.

Aspect 28: The apparatus of any of aspects 25-27, where the first interface is further configured to: output, to a second UE, a second physical channel transmission using second resources of the search space, where the second physical channel transmission is encoded in accordance with the rateless coding using a second identifier associated with the second UE, different than the identifier associated with the UE, as an input.

Aspect 29: The apparatus of any of aspects 25-28, where the identifier associated with the UE includes an RNTI.

Aspect 30: The apparatus of any of aspects 25-29, where the set of one or more physical channels includes a set of one or more PDCCH candidates.

Aspect 31: An apparatus for wireless communication at a UE, including: a processor; memory coupled with the processor; and instructions stored in the memory and executable by the processor to cause the apparatus to: receive, at the UE, an indication of an identifier associated with the UE; receive, at the UE, an indication of a search space associated with a set of one or more physical channel candidates encoded with a rateless coding; and monitor the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding.

Aspect 32: The apparatus of aspect 31, where the instructions to attempt to decode the physical channel candidate are executable by the processor to cause the apparatus to: receive, as an output of a set of one or more hash functions of the rateless coding, a set of candidate encoded values in accordance with inputting, into the set of one or more hash functions, the identifier associated with the UE and a set of candidate bit values for the physical channel candidate; receive, as an output of a numeric transposition function of the rateless coding, a set of candidate symbol values in accordance with inputting, into the numeric transposition function, each of the set of candidate encoded values; and compare a measurement of a signal associated with the physical channel candidate with each candidate symbol value of the set of candidate symbol values.

Aspect 33: The apparatus of aspect 32, where the instructions to compare the measurement of the signal associated with the physical channel candidate with each candidate symbol value of the set of candidate symbol values are executable by the processor to cause the apparatus to: determine, for each candidate symbol value of the set of candidate symbol values, a respective Euclidian distance between the measurement of the signal associated with the physical channel candidate and the candidate symbol value.

Aspect 34: The apparatus of any of aspects 32 or 33, where the rateless coding is associated with a set of multiple coding indices, each coding index of the set of multiple coding indices corresponding to a cumulative encoding of a respective quantity of message segments; and the set of candidate encoded values is a subset of a set of possible encoded values associated with a coding index corresponding to the signal associated with the physical channel candidate.

Aspect 35: The apparatus of aspect 34, where the set of candidate encoded values includes a single encoded value of the set of possible encoded values for each possible encoded value of a second set of possible encoded values associated with a second coding index that is different than the coding index corresponding to the signal associated with the physical channel candidate.

Aspect 36: The apparatus of any of aspects 32-35, where the instructions are further executable by the processor to cause the apparatus to: terminate the attempting to decode the physical channel candidate as a result of each of the comparisons, of the measurement of the signal associated with the physical channel candidate with each candidate symbol value of the set of candidate symbol values, failing to satisfy a decoding metric threshold.

Aspect 37: The apparatus of any of aspects 32-35, where the instructions are further executable by the processor to cause the apparatus to: proceed with the decoding of the physical channel candidate as a result of each of the comparisons, of the measurement of the signal associated with the physical channel candidate with each candidate symbol value of the set of candidate symbol values, satisfying a decoding metric threshold.

Aspect 38: The apparatus of any of aspects 31-37, where the identifier associated with the UE includes an RNTI associated with the UE.

Aspect 39: The apparatus of any of aspects 31-38, where the set of one or more physical channel candidates includes a set of one or more PDCCH candidates.

Aspect 40: An apparatus for wireless communication at a network entity, including: a processor; memory coupled with the processor; and instructions stored in the memory and executable by the processor to cause the apparatus to: transmit, to a UE, an indication of an identifier associated with the UE; transmit, to the UE, an indication of a search space associated with a set of one or more physical channels encoded with a rateless coding; and transmit, to the UE, a physical channel transmission using resources of the search space, where the physical channel transmission is encoded in accordance with the rateless coding using the identifier associated with the UE as an input value of the encoding.

Aspect 41: The apparatus of aspect 40, where the instructions are further executable by the processor to cause the apparatus to: encode the physical channel transmission, where the encoding includes: receive, as an output of a set of one or more hash functions, an encoded value in accordance with inputting, into the set of one or more hash functions, the identifier associated with the UE and a set of bit values associated with the physical channel transmission; receive, as an output of a numeric transposition function, a symbol value in accordance with inputting, into the numeric transposition function, the encoded value; and map the symbol value to the resources of the search space for transmission.

Aspect 42: The apparatus of any of aspects 40 or 41, where the rateless coding is associated with a set of multiple coding indices, each coding index of the set of multiple coding indices corresponding to a cumulative encoding of a respective quantity of message segments.

Aspect 43: The apparatus of any of aspects 40-42, where the instructions are further executable by the processor to cause the apparatus to: transmit, to a second UE, a second physical channel transmission using second resources of the search space, where the second physical channel transmission is encoded in accordance with the rateless coding using a second identifier associated with the second UE, different than the identifier associated with the UE, as an input.

Aspect 44: The apparatus of any of aspects 40-43, where the identifier associated with the UE includes an RNTI.

Aspect 45: The apparatus of any of aspects 40-44, where the set of one or more physical channels includes a set of one or more PDCCH candidates.

Aspect 46: An apparatus for wireless communication at a UE, including: means for receiving, at the UE, an indication of an identifier associated with the UE; means for receiving, at the UE, an indication of a search space associated with a set of one or more physical channel candidates encoded with a rateless coding; and means for monitoring the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding.

Aspect 47: The apparatus of aspect 46, where the means for attempting to decode the physical channel candidate include: means for receiving, as an output of a set of one or more hash functions of the rateless coding, a set of candidate encoded values in accordance with inputting, into the set of one or more hash functions, the identifier associated with the UE and a set of candidate bit values for the physical channel candidate; means for receiving, as an output of a numeric transposition function of the rateless coding, a set of candidate symbol values in accordance with inputting, into the numeric transposition function, each of the set of candidate encoded values; and means for comparing a measurement of a signal associated with the physical channel candidate with each candidate symbol value of the set of candidate symbol values.

Aspect 48: The apparatus of aspect 47, where the means for comparing the measurement of the signal associated with the physical channel candidate with each candidate symbol value of the set of candidate symbol values include: means for determining, for each candidate symbol value of the set of candidate symbol values, a respective Euclidian distance between the measurement of the signal associated with the physical channel candidate and the candidate symbol value.

Aspect 49: The apparatus of any of aspects 47 or 48, where the rateless coding is associated with a set of multiple coding indices, each coding index of the set of multiple coding indices corresponding to a cumulative encoding of a respective quantity of message segments; and the set of candidate encoded values is a subset of a set of possible encoded values associated with a coding index corresponding to the signal associated with the physical channel candidate.

Aspect 50: The apparatus of aspect 49, where the set of candidate encoded values includes a single encoded value of the set of possible encoded values for each possible encoded value of a second set of possible encoded values associated with a second coding index that is different than the coding index corresponding to the signal associated with the physical channel candidate.

Aspect 51: The apparatus of any of aspects 47-50, further including: means for terminating the attempting to decode the physical channel candidate as a result of each of the comparisons, of the measurement of the signal associated with the physical channel candidate with each candidate symbol value of the set of candidate symbol values, failing to satisfy a decoding metric threshold.

Aspect 52: The apparatus of any of aspects 47-50, further including: means for proceeding with the decoding of the physical channel candidate as a result of each of the comparisons, of the measurement of the signal associated with the physical channel candidate with each candidate symbol value of the set of candidate symbol values, satisfying a decoding metric threshold.

Aspect 53: The apparatus of any of aspects 46-52, where the identifier associated with the UE includes an RNTI associated with the UE.

Aspect 54: The apparatus of any of aspects 46-53, where the set of one or more physical channel candidates includes a set of one or more PDCCH candidates.

Aspect 55: An apparatus for wireless communication at a network entity, including: means for transmitting, to a UE, an indication of an identifier associated with the UE; means for transmitting, to the UE, an indication of a search space associated with a set of one or more physical channels encoded with a rateless coding; and means for transmitting, to the UE, a physical channel transmission using resources of the search space, where the physical channel transmission is encoded in accordance with the rateless coding using the identifier associated with the UE as an input value of the encoding.

Aspect 56: The apparatus of aspect 55, further including: means for encoding the physical channel transmission, where the encoding includes: means for receiving, as an output of a set of one or more hash functions, an encoded value in accordance with inputting, into the set of one or more hash functions, the identifier associated with the UE and a set of bit values associated with the physical channel transmission; means for receiving, as an output of a numeric transposition function, a symbol value in accordance with inputting, into the numeric transposition function, the encoded value; and means for mapping the symbol value to the resources of the search space for transmission.

Aspect 57: The apparatus of any of aspects 55 or 56, where the rateless coding is associated with a set of multiple coding indices, each coding index of the set of multiple coding indices corresponding to a cumulative encoding of a respective quantity of message segments.

Aspect 58: The apparatus of any of aspects 55-57, further including: means for transmitting, to a second UE, a second physical channel transmission using second resources of the search space, where the second physical channel transmission is encoded in accordance with the rateless coding using a second identifier associated with the second UE, different than the identifier associated with the UE, as an input.

Aspect 59: The apparatus of any of aspects 55-58, where the identifier associated with the UE includes an RNTI.

Aspect 60: The apparatus of any of aspects 55-59, where the set of one or more physical channels includes a set of one or more PDCCH candidates.

Aspect 61: A non-transitory computer-readable medium storing code for wireless communication at a UE, the code including instructions executable by a processor to: receive, at the UE, an indication of an identifier associated with the UE; receive, at the UE, an indication of a search space associated with a set of one or more physical channel candidates encoded with a rateless coding; and monitor the search space associated with the set of one or more physical channel candidates, where the monitoring includes attempting to decode a physical channel candidate of the set of one or more physical channel candidates in accordance with the rateless coding using the identifier associated with the UE as an input value of the attempted decoding.

Aspect 62: The non-transitory computer-readable medium of aspect 61, where the instructions to attempt to decode the physical channel candidate are executable by the processor to: receive, as an output of a set of one or more hash functions of the rateless coding, a set of candidate encoded values in accordance with inputting, into the set of one or more hash functions, the identifier associated with the UE and a set of candidate bit values for the physical channel candidate; receive, as an output of a numeric transposition function of the rateless coding, a set of candidate symbol values in accordance with inputting, into the numeric transposition function, each of the set of candidate encoded values; and compare a measurement of a signal associated with the physical channel candidate with each candidate symbol value of the set of candidate symbol values.

Aspect 63: The non-transitory computer-readable medium of aspect 62, where the instructions to compare the measurement of the signal associated with the physical channel candidate with each candidate symbol value of the set of candidate symbol values are executable by the processor to: determine, for each candidate symbol value of the set of candidate symbol values, a respective Euclidian distance between the measurement of the signal associated with the physical channel candidate and the candidate symbol value.

Aspect 64: The non-transitory computer-readable medium of any of aspects 62 or 63, where the rateless coding is associated with a set of multiple coding indices, each coding index of the set of multiple coding indices corresponding to a cumulative encoding of a respective quantity of message segments; and the set of candidate encoded values is a subset of a set of possible encoded values associated with a coding index corresponding to the signal associated with the physical channel candidate.

Aspect 65: The non-transitory computer-readable medium of aspect 64, where the set of candidate encoded values includes a single encoded value of the set of possible encoded values for each possible encoded value of a second set of possible encoded values associated with a second coding index that is different than the coding index corresponding to the signal associated with the physical channel candidate.

Aspect 66: The non-transitory computer-readable medium of any of aspects 62-65, where the instructions are further executable by the processor to: terminate the attempting to decode the physical channel candidate as a result of each of the comparisons, of the measurement of the signal associated with the physical channel candidate with each candidate symbol value of the set of candidate symbol values, failing to satisfy a decoding metric threshold.

Aspect 67: The non-transitory computer-readable medium of any of aspects 62-65, where the instructions are further executable by the processor to: proceed with the decoding of the physical channel candidate as a result of each of the comparisons, of the measurement of the signal associated with the physical channel candidate with each candidate symbol value of the set of candidate symbol values, satisfying a decoding metric threshold.

Aspect 68: The non-transitory computer-readable medium of any of aspects 61-67, where the identifier associated with the UE includes an RNTI associated with the UE.

Aspect 69: The non-transitory computer-readable medium of any of aspects 61-68, where the set of one or more physical channel candidates includes a set of one or more PDCCH candidates.

Aspect 70: A non-transitory computer-readable medium storing code for wireless communication at a network entity, the code including instructions executable by a processor to: transmit, to a UE, an indication of an identifier associated with the UE; transmit, to the UE, an indication of a search space associated with a set of one or more physical channels encoded with a rateless coding; and transmit, to the UE, a physical channel transmission using resources of the search space, where the physical channel transmission is encoded in accordance with the rateless coding using the identifier associated with the UE as an input value of the encoding.

Aspect 71: The non-transitory computer-readable medium of aspect 70, where the instructions are further executable by the processor to: encode the physical channel transmission, where the encoding includes: receive, as an output of a set of one or more hash functions, an encoded value in accordance with inputting, into the set of one or more hash functions, the identifier associated with the UE and a set of bit values associated with the physical channel transmission; receive, as an output of a numeric transposition function, a symbol value in accordance with inputting, into the numeric transposition function, the encoded value; and map the symbol value to the resources of the search space for transmission.

Aspect 72: The non-transitory computer-readable medium of any of aspects 70 or 71, where the rateless coding is associated with a set of multiple coding indices, each coding index of the set of multiple coding indices corresponding to a cumulative encoding of a respective quantity of message segments.

Aspect 73: The non-transitory computer-readable medium of any of aspects 70-72, where the instructions are further executable by the processor to: transmit, to a second UE, a second physical channel transmission using second resources of the search space, where the second physical channel transmission is encoded in accordance with the rateless coding using a second identifier associated with the second UE, different than the identifier associated with the UE, as an input.

Aspect 74: The non-transitory computer-readable medium of any of aspects 70-73, where the identifier associated with the UE includes an RNTI.

Aspect 75: The non-transitory computer-readable medium of any of aspects 70-74, where the set of one or more physical channels includes a set of one or more PDCCH candidates.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described herein as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a user equipment (UE), comprising:
a first interface configured to:
obtain, at the UE, an indication of an identifier associated with the UE;

obtain, at the UE, an indication of a search space associated with a set of one or more physical channel candidates encoded with a rateless coding; and the first interface, a second interface, or a processing system configured to:

monitor the search space associated with the set of one or more physical channel candidates, wherein the monitoring includes attempting to decode a physical channel candidate of the set of one or more physical channel candidates in accordance with the rateless coding using the identifier associated with the UE as an input value of the attempted decoding.

2. The apparatus of claim 1, wherein, to attempt to decode the physical channel candidate, the processing system may be further configured to:

obtain, as an output of a set of one or more hash functions of the rateless coding, a set of candidate encoded values in accordance with inputting, into the set of one or more hash functions, the identifier associated with the UE and a set of candidate bit values for the physical channel candidate;

obtain, as an output of a numeric transposition function of the rateless coding, a set of candidate symbol values in accordance with inputting, into the numeric transposition function, each of the set of candidate encoded values; and compare a measurement of a signal associated with the physical channel candidate with each candidate symbol value of the set of candidate symbol values.

3. The apparatus of claim 2, wherein, to compare the measurement of the signal associated with the physical channel candidate with each candidate symbol value of the set of candidate symbol values, the processing system may be further configured to:

determine, for each candidate symbol value of the set of candidate symbol values, a respective Euclidian distance between the measurement of the signal associated with the physical channel candidate and the candidate symbol value.

4. The apparatus of claim 2, wherein:

the rateless coding is associated with a plurality of coding indices, each coding index of the plurality of coding indices corresponding to a cumulative encoding of a respective quantity of message segments; and the set of candidate encoded values is a subset of a set of possible encoded values associated with a coding index corresponding to the signal associated with the physical channel candidate.

5. The apparatus of claim 4, wherein the set of candidate encoded values comprises a single encoded value of the set of possible encoded values for each possible encoded value of a second set of possible encoded values associated with a second coding index that is different than the coding index corresponding to the signal associated with the physical channel candidate.

6. The apparatus of claim 2, wherein the processing system is further configured to:

terminate the attempting to decode the physical channel candidate as a result of each of the comparisons, of the measurement of the signal associated with the physical channel candidate with each candidate symbol value of the set of candidate symbol values, failing to satisfy a decoding metric threshold.

7. The apparatus of claim 2, wherein the processing system is further configured to:

proceed with the decoding of the physical channel candidate as a result of each of the comparisons, of the measurement of the signal associated with the physical channel candidate with each candidate symbol value of the set of candidate symbol values, satisfying a decoding metric threshold.

8. The apparatus of claim 1, wherein the identifier associated with the UE comprises a radio network temporary identifier (RNTI) associated with the UE.

9. The apparatus of claim 1, wherein the set of one or more physical channel candidates comprises a set of one or more physical downlink control channel (PDCCH) candidates.

10. An apparatus for wireless communication at a network entity, comprising:

a first interface configured to:

output, to a user equipment (UE), an indication of an identifier associated with the UE;

output, to the UE, an indication of a search space associated with a set of one or more physical channels encoded with a rateless coding; and output, to the UE, a physical channel transmission using resources of the search space, wherein the physical channel transmission is encoded in accordance with the rateless coding using the identifier associated with the UE as an input value of the encoding.

11. The apparatus of claim 10, further comprising:

a processing system configured to:

encode the physical channel transmission, wherein the encoding comprises:

obtain, as an output of a set of one or more hash functions, an encoded value in accordance with inputting, into the set of one or more hash functions, the identifier associated with the UE and a set of bit values associated with the physical channel transmission;

obtain, as an output of a numeric transposition function, a symbol value in accordance with inputting, into the numeric transposition function, the encoded value; and map the symbol value to the resources of the search space for transmission.

12. The apparatus of claim 10, wherein the rateless coding is associated with a plurality of coding indices, each coding index of the plurality of coding indices corresponding to a cumulative encoding of a respective quantity of message segments.

13. The apparatus of claim 10, wherein the first interface is further configured to:

output, to a second UE, a second physical channel transmission using second resources of the search space, wherein the second physical channel transmission is encoded in accordance with the rateless coding using a second identifier associated with the second UE, different than the identifier associated with the UE, as an input.

14. The apparatus of claim 10, wherein the identifier associated with the UE comprises a radio network temporary identifier (RNTI).

15. The apparatus of claim 10, wherein the set of one or more physical channels comprises a set of one or more physical downlink control channel (PDCCH) candidates.

16. A method for wireless communication at a user equipment (UE), comprising:

receiving, at the UE, an indication of an identifier associated with the UE;

receiving, at the UE, an indication of a search space associated with a set of one or more physical channel candidates encoded with a rateless coding; and monitoring the search space associated with the set of one or more physical channel candidates, wherein the monitoring includes attempting to decode a physical channel candidate of the set of one or more physical channel candidates in accordance with the rateless coding using the identifier associated with the UE as an input value of the attempted decoding.

17. The method of claim 16, wherein attempting to decode the physical channel candidate comprises:

receiving, as an output of a set of one or more hash functions of the rateless coding, a set of candidate encoded values in accordance with inputting, into the set of one or more hash functions, the identifier associated with the UE and a set of candidate bit values for the physical channel candidate;

receiving, as an output of a numeric transposition function of the rateless coding, a set of candidate symbol values in accordance with inputting, into the numeric transposition function, each of the set of candidate encoded values; and comparing a measurement of a signal associated with the physical channel candidate with each candidate symbol value of the set of candidate symbol values.

18. The method of claim 17, wherein comparing the measurement of the signal associated with the physical channel candidate with each candidate symbol value of the set of candidate symbol values comprises:

determining, for each candidate symbol value of the set of candidate symbol values, a respective Euclidian distance between the measurement of the signal associated with the physical channel candidate and the candidate symbol value.

19. The method of claim 17, wherein:

the rateless coding is associated with a plurality of coding indices, each coding index of the plurality of coding indices corresponding to a cumulative encoding of a respective quantity of message segments; and the set of candidate encoded values is a subset of a set of possible encoded values associated with a coding index corresponding to the signal associated with the physical channel candidate.

20. The method of claim 19, wherein the set of candidate encoded values comprises a single encoded value of the set of possible encoded values for each possible encoded value of a second set of possible encoded values associated with a second coding index that is different than the coding index corresponding to the signal associated with the physical channel candidate.

21. The method of claim 17, further comprising:

terminating the attempting to decode the physical channel candidate as a result of each of the comparisons, of the measurement of the signal associated with the physical channel candidate with each candidate symbol value of the set of candidate symbol values, failing to satisfy a decoding metric threshold.

22. The method of claim 17, further comprising:

proceeding with the decoding of the physical channel candidate as a result of each of the comparisons, of the measurement of the signal associated with the physical channel candidate with each candidate symbol value of the set of candidate symbol values, satisfying a decoding metric threshold.

23. The method of claim 16, wherein the identifier associated with the UE comprises a radio network temporary identifier (RNTI) associated with the UE.

24. The method of claim 16, wherein the set of one or more physical channel candidates comprises a set of one or more physical downlink control channel (PDCCH) candidates.

25. A method for wireless communication at a network entity, comprising:

transmitting, to a user equipment (UE), an indication of an identifier associated with the UE;

transmitting, to the UE, an indication of a search space associated with a set of one or more physical channels encoded with a rateless coding; and transmitting, to the UE, a physical channel transmission using resources of the search space, wherein the physical channel transmission is encoded in accordance with the rateless coding using the identifier associated with the UE as an input value of the encoding.

26. The method of claim 25, further comprising:

encoding the physical channel transmission, wherein the encoding comprises:

receiving, as an output of a set of one or more hash functions, an encoded value in accordance with inputting, into the set of one or more hash functions, the identifier associated with the UE and a set of bit values associated with the physical channel transmission;

receiving, as an output of a numeric transposition function, a symbol value in accordance with inputting, into the numeric transposition function, the encoded value; and mapping the symbol value to the resources of the search space for transmission.

27. The method of claim 25, wherein the rateless coding is associated with a plurality of coding indices, each coding index of the plurality of coding indices corresponding to a cumulative encoding of a respective quantity of message segments.

28. The method of claim 25, further comprising:

transmitting, to a second UE, a second physical channel transmission using second resources of the search space, wherein the second physical channel transmission is encoded in accordance with the rateless coding using a second identifier associated with the second UE, different than the identifier associated with the UE, as an input.

29. The method of claim 25, wherein the identifier associated with the UE comprises a radio network temporary identifier (RNTI).

30. The method of claim 25, wherein the set of one or more physical channels comprises a set of one or more physical downlink control channel (PDCCH) candidates.

* * * * *